United States Patent
Du

(10) Patent No.: US 10,020,649 B2
(45) Date of Patent: Jul. 10, 2018

(54) PROTECTIVE DEVICE WITH SELF-TEST

(71) Applicant: Pass & Seymour, Inc., Syracuse, NY (US)

(72) Inventor: Hai Hu Du, Dongguan (CN)

(73) Assignee: PASS & SEYMOUR, INC., Syracuse, NY (US)

( * ) Notice: Subject to any disclaimer, the term of this patent is extended or adjusted under 35 U.S.C. 154(b) by 446 days.

(21) Appl. No.: 14/806,991

(22) Filed: Jul. 23, 2015

(65) Prior Publication Data

US 2017/0025846 A1 Jan. 26, 2017

(51) Int. Cl.
 *H02H 3/20* (2006.01)
 *H02H 3/16* (2006.01)
 *H02H 3/33* (2006.01)
 *H02H 9/04* (2006.01)

(52) U.S. Cl.
 CPC ............ *H02H 3/335* (2013.01); *H02H 9/041* (2013.01)

(58) Field of Classification Search
 CPC .......... H02H 3/20; H02H 3/162; H02H 3/335; H02H 9/041
 USPC ...................................................... 361/91.1
 See application file for complete search history.

(56) References Cited

U.S. PATENT DOCUMENTS

| | | | |
|---|---|---|---|
| 5,594,398 A | 1/1997 | Marcou et al. |
| 5,600,524 A | 2/1997 | Neiger et al. |
| 5,661,623 A | 8/1997 | McDonald et al. |
| 5,715,125 A | 2/1998 | Neiger et al. |
| 5,754,113 A | 5/1998 | Boyer |
| 6,040,967 A | 3/2000 | DiSalvo |
| 6,052,265 A | 4/2000 | Zaretsky et al. |
| 6,111,733 A | 8/2000 | Neiger et al. |
| 6,246,558 B1 | 6/2001 | DiSalvo et al. |
| 6,253,121 B1 | 6/2001 | Cline et al. |
| 6,262,871 B1 | 7/2001 | Nemir et al. |
| 6,426,632 B1 | 7/2002 | Clunn |
| 6,426,634 B1 | 7/2002 | Clunn et al. |
| 6,437,700 B1 | 8/2002 | Herzfeld et al. |
| 6,472,882 B1 | 10/2002 | Tiemann et al. |
| 6,622,510 B2 | 9/2003 | Giroux et al. |
| 6,798,209 B2 | 9/2004 | Lavoie et al. |
| 6,807,035 B1 | 10/2004 | Baldwin et al. |
| 6,807,036 B2 | 10/2004 | Baldwin |
| 6,831,819 B2 | 12/2004 | Nemir et al. |
| 6,850,394 B2 | 2/2005 | Kim |
| 6,930,574 B2 | 8/2005 | Gao |
| 6,998,945 B2 | 2/2006 | Huang et al. |

(Continued)

*Primary Examiner* — Kevin J Comber
(74) *Attorney, Agent, or Firm* — Bond Schoeneck & King, PLLC; Frederick Price; George McGuire

(57) ABSTRACT

A protective electrical wiring device includes a protective assembly including a sensor portion, a fault detection portion and a switch portion. A control circuit is configured to automatically perform a test cycle from time to time, each test cycle including a series of tests that determine the operational state of the protective assembly. At least one successive test in the test cycle is configured to test at least a portion of the protective assembly tested by a predecessor test in the test cycle. The control circuit is configured to establish a test result for each test in the series of tests, with each test result being stored in a test result table. The control circuit is configured to effect or not effect an end-of-life state by evaluating at least a portion of the test results in the test result table in accordance with a predetermined voting scheme.

25 Claims, 13 Drawing Sheets

(56) References Cited

U.S. PATENT DOCUMENTS

| | | |
|---|---|---|
| 7,026,895 B2 | 4/2006 | Germain et al. |
| 7,031,125 B2 | 4/2006 | Germain et al. |
| 7,031,126 B2 | 4/2006 | Bonilla et al. |
| 7,099,129 B2 | 8/2006 | Neiger et al. |
| 7,116,191 B2 | 10/2006 | Wang |
| 7,124,041 B1 | 10/2006 | Johnson et al. |
| 7,149,065 B2 | 12/2006 | Baldwin et al. |
| 7,167,066 B2 | 1/2007 | Wang |
| 7,184,250 B2 | 2/2007 | Bonilla et al. |
| 7,195,500 B2 | 3/2007 | Huang et al. |
| 7,215,520 B2 | 7/2007 | Neal |
| 7,265,956 B2 | 9/2007 | Huang |
| 7,268,559 B1 | 9/2007 | Chen et al. |
| 7,289,306 B2 | 10/2007 | Huang |
| 7,292,419 B1 | 11/2007 | Nemir |
| 7,292,420 B2 | 11/2007 | Jones |
| 7,295,415 B2 | 11/2007 | Huang et al. |
| 7,307,821 B2 | 12/2007 | Wang |
| 7,315,227 B2 | 1/2008 | Huang et al. |
| 7,315,437 B2 | 1/2008 | Bonilla et al. |
| 7,317,600 B2 | 1/2008 | Huang et al. |
| 7,336,457 B2 | 2/2008 | Liscinsky, III |
| 7,372,678 B2 | 5/2008 | DiSalvo et al. |
| 7,408,432 B2 | 8/2008 | Shi |
| 7,411,766 B1 | 8/2008 | Huang et al. |
| 7,414,818 B2 | 8/2008 | Shi |
| 7,443,309 B2 | 10/2008 | Baldwin et al. |
| 7,486,492 B2 | 2/2009 | Elms |
| 7,492,558 B2 | 2/2009 | Germain et al. |
| 7,492,559 B2 | 2/2009 | Zhang et al. |
| 7,518,840 B2 | 4/2009 | Elms |
| 7,522,064 B2 | 4/2009 | Zhang et al. |
| 7,525,402 B2 | 4/2009 | Gao |
| 7,525,441 B2 | 4/2009 | Zhang et al. |
| 7,535,371 B2 | 5/2009 | Wang |
| 7,538,993 B2 | 5/2009 | Huang et al. |
| 7,538,994 B2 | 5/2009 | Bonilla et al. |
| 7,542,252 B2 | 6/2009 | Chan et al. |
| 7,568,719 B2 | 8/2009 | Sauter |
| 7,576,959 B2 | 8/2009 | Huang et al. |
| 7,576,960 B2 | 8/2009 | Gao et al. |
| 7,592,924 B2 | 9/2009 | Zhang et al. |
| 7,626,788 B2 | 12/2009 | Wang et al. |
| 7,633,726 B2 | 12/2009 | Huang et al. |
| 7,636,224 B2 | 12/2009 | Zandonella Balco |
| 7,668,295 B2 | 2/2010 | Tang et al. |
| 7,692,904 B2 | 4/2010 | Li et al. |
| 7,733,617 B2 | 6/2010 | Baldwin et al. |
| 7,791,848 B2 | 9/2010 | Baldwin et al. |
| 7,791,850 B2 | 9/2010 | Chen |
| 7,800,873 B2 | 9/2010 | Batko et al. |
| 7,800,874 B2 | 9/2010 | DiSalvo et al. |
| 7,843,197 B2 | 12/2010 | Finlay et al. |
| 7,852,606 B2 | 12/2010 | Mernyk et al. |
| 7,859,368 B2 | 12/2010 | Huang et al. |
| 7,986,501 B2 | 1/2011 | Kamor et al. |
| 7,889,465 B2 | 2/2011 | Bonilla et al. |
| 7,907,371 B2 | 3/2011 | Campolo et al. |
| 7,911,746 B2 | 3/2011 | Zaretsky et al. |
| 7,924,537 B2 | 4/2011 | Mernyk |
| 7,936,543 B2 | 5/2011 | Restrepo et al. |
| 7,940,498 B2 | 5/2011 | Huang |
| 7,944,331 B2 | 5/2011 | Porter et al. |
| 7,944,653 B2 | 5/2011 | Chen et al. |
| 7,990,663 B2 | 8/2011 | Ziegler et al. |
| 8,004,804 B2 | 8/2011 | Germain et al. |
| 8,023,235 B2 | 9/2011 | Bilac et al. |
| 8,054,590 B2 | 11/2011 | Li et al. |
| 8,081,001 B2 | 12/2011 | Hooper et al. |
| 8,085,516 B1 | 12/2011 | Armstrong |
| 8,089,738 B2 | 1/2012 | Bonilla et al. |
| 8,125,748 B2 | 2/2012 | Zheng |
| 8,159,794 B2 | 4/2012 | Baldwin et al. |
| 8,164,403 B2 | 4/2012 | Li |
| 8,183,869 B2 | 5/2012 | Chan et al. |
| 8,233,251 B2 | 7/2012 | Huang et al. |
| 8,300,368 B2 | 10/2012 | Huang et al. |
| 8,384,392 B2 | 2/2013 | Lewinski et al. |
| 8,400,321 B2 | 3/2013 | Williams |
| 8,436,739 B2 | 5/2013 | Elms et al. |
| 8,462,471 B2 | 6/2013 | Huang et al. |
| 8,526,144 B2 | 9/2013 | Kevelos et al. |
| 8,547,126 B2 | 10/2013 | Ostrovsky et al. |
| 8,558,646 B2 | 10/2013 | Li |
| 8,563,882 B2 | 10/2013 | Yang |
| 8,564,307 B2 | 10/2013 | Kolker et al. |
| 8,570,181 B2 | 10/2013 | Kinsel et al. |
| 8,582,257 B2 | 11/2013 | Love et al. |
| 8,599,522 B2 | 12/2013 | Aronov et al. |
| 8,625,238 B2 | 1/2014 | Ritzinger |
| 8,633,678 B2 | 1/2014 | Yegin et al. |
| 8,698,504 B2 | 4/2014 | Wei et al. |
| 8,717,718 B2 | 5/2014 | Kamor et al. |
| 8,736,279 B2 | 5/2014 | Huang |
| 8,737,033 B2 | 5/2014 | Parker et al. |
| 8,749,326 B2 | 6/2014 | Yang et al. |
| 8,760,824 B2 | 6/2014 | Armstrong |
| 8,760,849 B2 | 6/2014 | Huang |
| 2006/0125622 A1* | 6/2006 | Baldwin ............... H01H 83/04 340/514 |
| 2013/0241677 A1 | 9/2013 | Padro et al. |
| 2013/0241678 A1 | 9/2013 | Bonasia et al. |
| 2014/0071575 A1 | 3/2014 | Parket et al. |

* cited by examiner

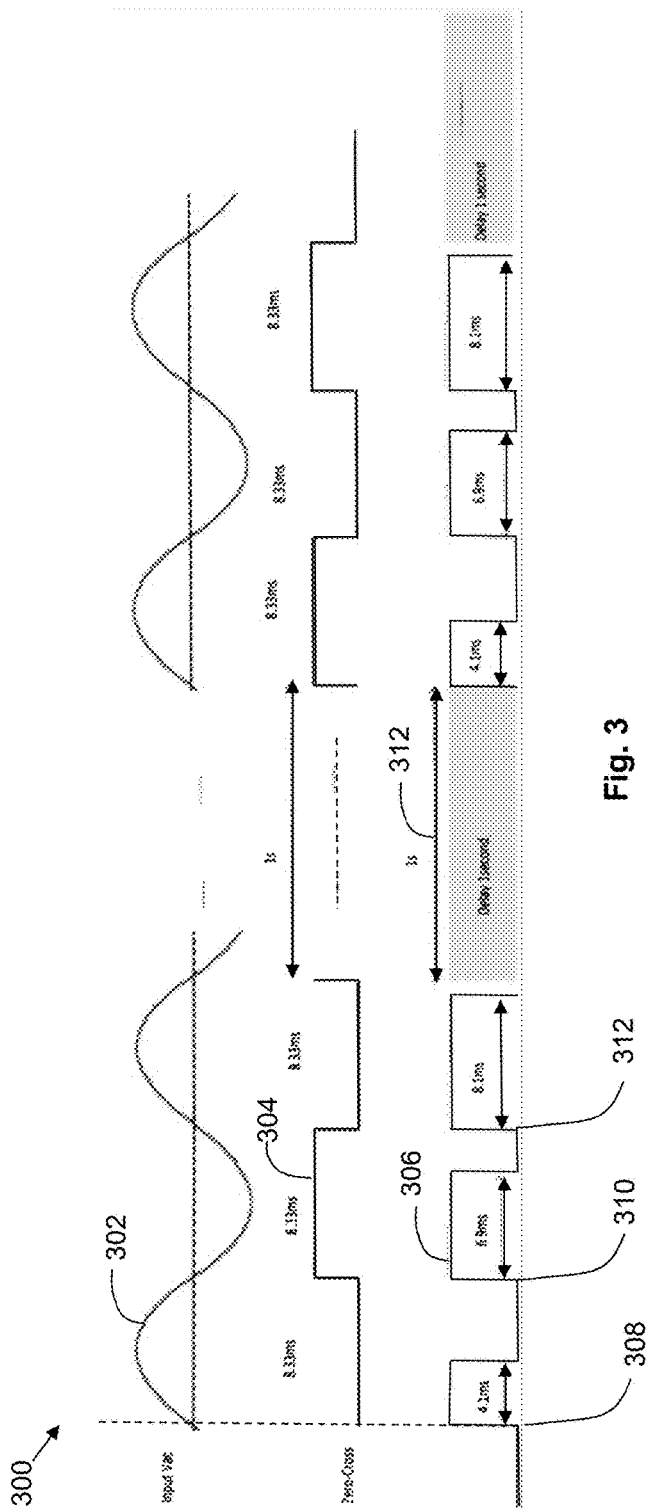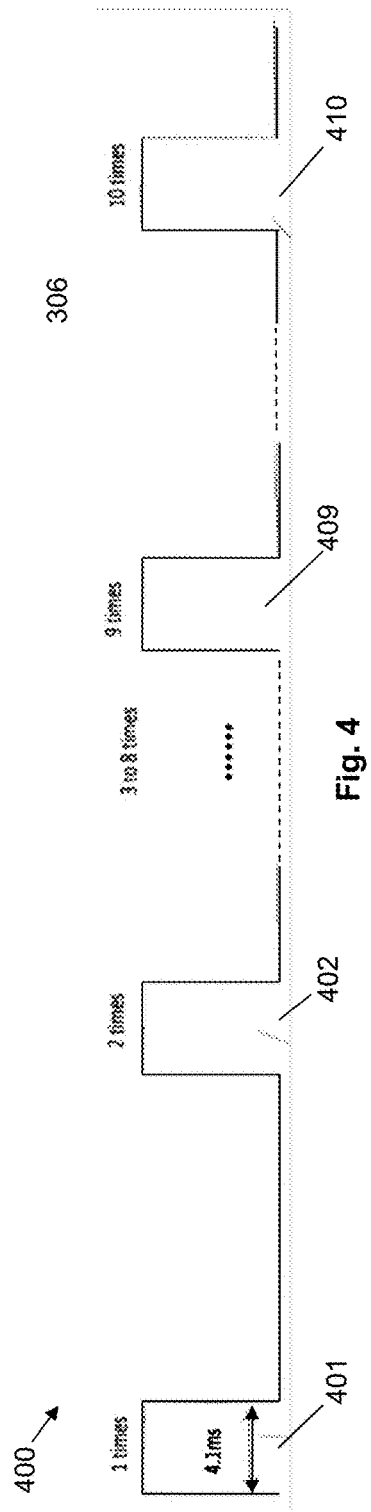

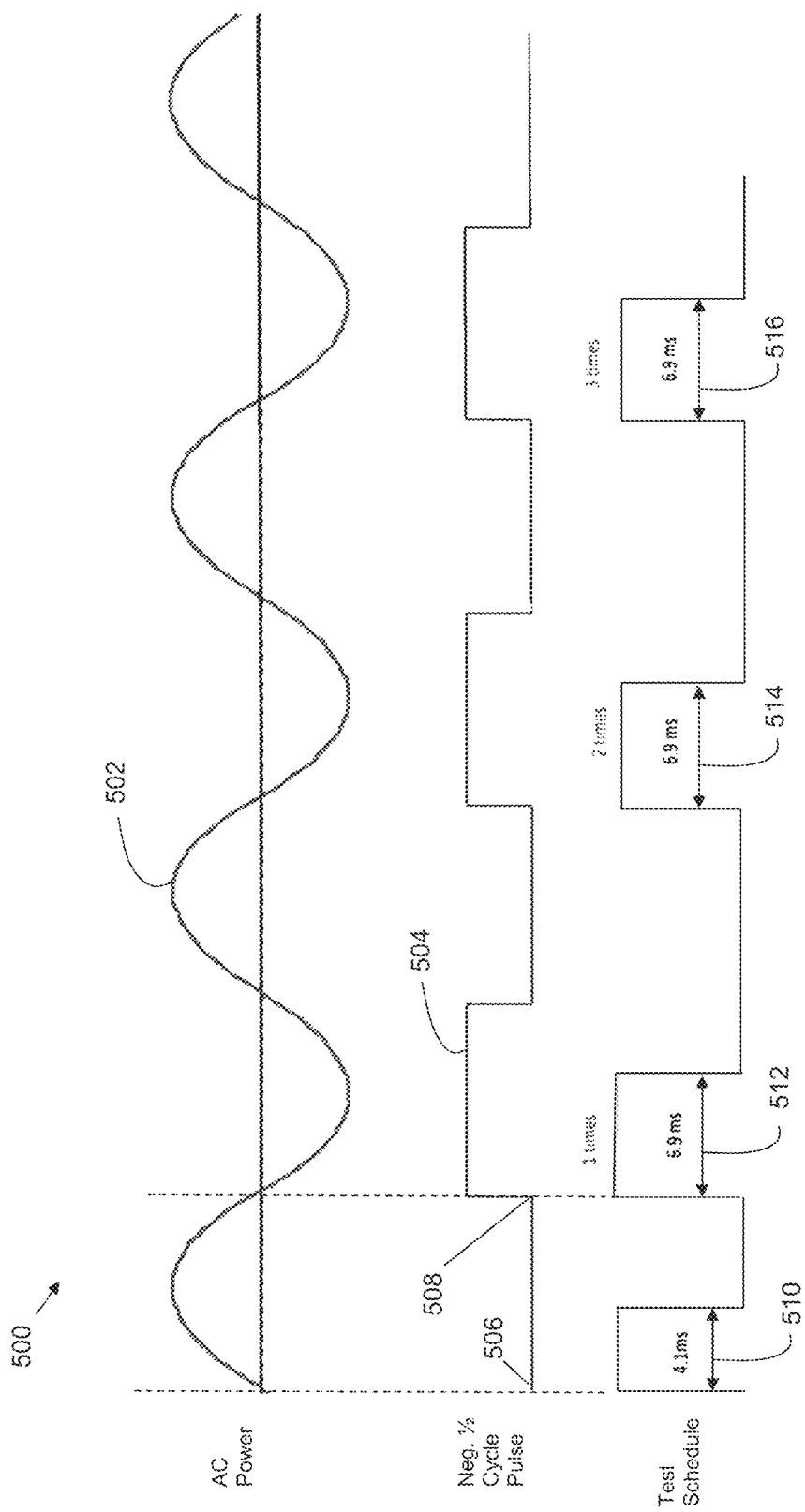

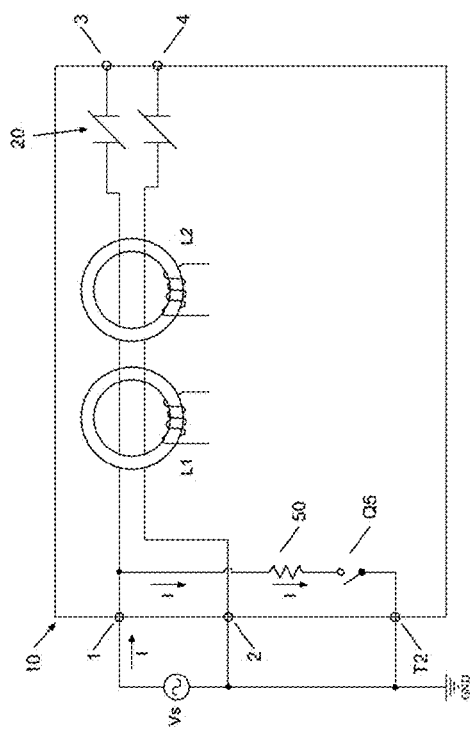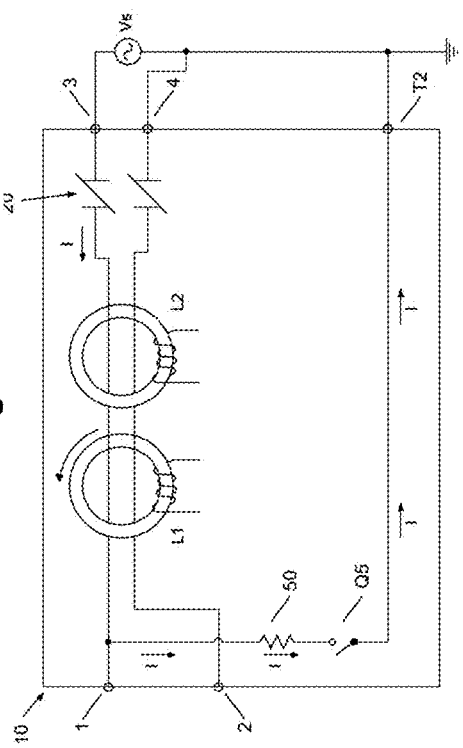
Fig. 11A
Fig. 11B

PROTECTIVE DEVICE WITH SELF-TEST

BACKGROUND OF THE INVENTION

1. Field of the Invention

The present invention relates generally to electrical wiring devices for use in an electrical distribution system, and particularly to protective electrical wiring devices.

2. Technical Background

Protective devices are used to protect personnel or property from fault conditions that arise in AC electrical distribution systems. The ground fault circuit interrupter (GFCI) is a type of protective device that is configured to detect ground leakage currents that exceeds a predetermined amount. Upon detection of excessive fault currents, the device is further configured to trip a set of interrupting contacts to protect human beings from serious electrical shock or even electrocution, or prevent the fault condition from damaging property.

The arc fault circuit interrupter (AFCI) is another class of protective devices that is configured to detect and interrupt electrical arcing. Electrical arcing is a fire hazard because it can ignite combustible materials (such as those used to construct residential or commercial structures).

Protective devices are typically found in at least three locations within a structure. For example, protective devices may be installed within the electrical wiring panel; in this instance, they are often combined with circuit breakers. Protective devices may be installed within device boxes. In this configuration they are classified as "wiring devices," and often include receptacle outlets. In the third example, protective devices may be configured as portable devices. In this configuration, the portable protection device may be associated with load equipment, or with AC attachment plugs.

There are combination devices currently available that include both GFCI and AFCI protection. Moreover, protective wiring devices are often combined with other wiring device features. For example, GFCIs or AFCIs may include switches, dimmers, night lights, occupancy switches or receptacles.

All products that rely on electronic components and mechanical parts eventually fail over time. Protective devices are no different. Early on in the development of protective devices (such as GFCIs), a manually operable test button was provided so that the user could periodically test the device to determine if it was still operable. Moreover, the device usually came with instructions that outlined the manual test procedure. Unfortunately, users routinely ignored those instructions and many devices were installed but no longer functioning. In response to this reality, designers began to include self-testing circuitry that automatically tested the device and determined if the device was operable and protective. Briefly then, the self-test feature relieves the user from having to test the device.

An important self-test design consideration relates to the prevention of nuisance tripping. In other words, a self-test (i.e., an automatic test) should not cause the device to trip if a fault or an end-of-life condition is not extant. In one approach that has been considered, nuisance tripping is avoided by taking the protective device off line while the test is being executed. This gives the needed time to perform the test without nuisance tripping risk but unfortunately the device is unresponsive to real fault conditions that could be happening during a recurring test period.

In another approach to automated self-testing that has been considered, the protective device continues to operate (i.e., it is not taken off line); and self-testing is performed during "idle periods." For example, a protective device may be configured to monitor the electrical distribution system for fault conditions during a predetermined AC half cycle polarity (e.g. the positive half cycle) and use the "idle" opposite polarity (e.g., the negative half cycle) for automated self-testing. Thus, the device performs both protection and self-testing without being in an offline state. In one drawback to this approach, the auto-testing process extended into the next half cycle and nuisance tripping was found to occur. Another drawback to this approach relates to the need to operate a power supply during both half-cycles of the AC line cycle. Specifically, this might require a full wave bridge power supply instead of a half-wave power supply. The full-wave power supplies often add cost and complexity.

In yet another approach that has been considered, the self-test procedure divides the auto-test into multiple test portions; wherein each test portion tests a separate portion of the protective device in a different AC cycle. While each test portion avoids nuisance tripping by taking less than a half cycle to perform, this method also has drawbacks. For example, while this process avoids nuisance tripping, the self-test procedure does not test the way the protective device truly operates when it senses and detects an authentic fault condition. Another drawback to this approach relates to the fact that, when taken together, the multiple test portions fail to test every part of the protective device. One reason for this outcome is that the device is configured to operate in a sequential manner, and when the testing is not performed sequentially, there are certain parts of the device that "are hard to reach" by separate and discrete tests (in fact, these circuits are typically not tested). Another drawback to this approach relates to the electronic components that are getting tested separately; while these parts are subject to some testing, the test does not subject them to the conditions they experience during a true fault condition. For example, in one device on the market, even though the self-test only charges a certain capacitor (in the trigger circuit) to a fraction of the voltage it must attain during the true fault condition, the test assumes that the capacitor is working properly.

Another problem that arises relates to miswiring the device. Miswire refers to a condition wherein the device installer connects the AC supply voltage to the feed-through load terminals (which are intended to be connected to downstream receptacles) instead of the line terminals of the device. If the miswired condition is not detected, the load terminals provided by the receptacles on the face of the electrical wiring device can be unprotected in the presence of a fault condition.

What is needed is a protective device that includes an automated self-testing procedure that addresses the needs outlined above in a cost effective manner. Specifically, what is needed is a self-testing protective device that performs self-testing while avoiding nuisance tripping. What is also needed is an automatic self-test that checks for a miswire condition. An automated self-testing procedure that includes multiple test portions (performed over multiple AC cycles) is also needed; a test of this type would provide for a way that tests every part of the fault detection apparatus in a manner consistent with the operating parameters of the protective device.

SUMMARY OF THE INVENTION

The present invention addresses the needs described above by providing a protective device that includes an automated self-testing procedure that addresses the needs outlined above in a cost effective manner. Specifically, the present invention performs self-testing while avoiding nuisance tripping. The present invention also is configured to include an automated self-testing procedure that includes multiple test portions that are performed over multiple AC cycles. Taken together, the automated self-testing procedure of the present invention tests every part of the fault detection apparatus in a manner consistent with the operating parameters of the protective device.

One aspect of the present invention is directed to a protective electrical wiring device that includes a plurality of line terminals and a plurality of load terminals configured to be coupled to an AC electrical distribution system. A protective assembly includes a sensor portion, a fault detection portion and a switch portion. The sensor portion is configured to provide at least one sensor signal corresponding to electrical signals propagating on the plurality of line terminals or the plurality of load terminals. The fault detection portion is configured to provide a detector output signal when the at least one sensor signal exceeds a predetermined threshold. The switch portion includes a conditioning circuit coupled to a switch element, the conditioning circuit generating a control voltage signal in response to the detector output signal. The switch element is configured to turn ON when the control voltage signal is greater than or equal to a switch actuation threshold. A control circuit is configured to automatically perform a test cycle from time to time, each test cycle comprising a series of tests that determine the operational state of the protective assembly. At least one successive test in the test cycle is configured to test at least a portion of the protective assembly tested by a predecessor test in the test cycle. The control circuit is configured to establish a test result for each test in the series of tests, each test result being stored in a test result table. The control circuit is configured to effect or not effect an end-of-life state by evaluating at least a portion of the test results in the test result table in accordance with a predetermined voting scheme.

In one embodiment, the test table includes test results from a plurality of test cycles, the predetermined voting scheme allowing at least one predetermined pattern of test failures to occur for each test in the series of tests within a predetermined number of test cycles before the control circuit effects the end-of-life state.

In one embodiment, the predetermined voting scheme provides a predetermined number of allowable aggregate test table failures to occur within a predetermined number of test cycles, the control circuit being configured to effect the end-of-life state when an aggregate number of test failures in the test table is greater than or equal to the predetermined number of allowable aggregate test table failures.

In a version of the embodiment, the control circuit is configured to effect the end-of-life state based on the aggregate number of test failures even when a number of tests failures attributable to each individual test in the series of tests is less than a failure number required by the predetermined voting scheme.

In one embodiment, the predetermined number of allowable test failures for one test in the series of tests is different than the predetermined number of allowable column test failures for another test in the series of tests. for a given number of test cycles there In a version of the embodiment, the predetermined number of allowable test failures for the one test are for a first predetermined number of cycles and the predetermined number of allowable column test failures for the other test are for a second predetermined number of cycles.

In one embodiment, the control circuit is configured to generate a recurring test signal in a first test of the series of tests, the sensor portion and the fault detection portion being operational if the conditioning circuit provides the control voltage signal in response to the recurring signal, the control circuit terminating the recurring test signal when the control voltage signal reaches a test acceptance voltage, the control circuit storing a first test result in the test table indicative of whether the control voltage signal reaches the test acceptance voltage within a predetermined time frame.

In one embodiment, the fault detection portion includes a delay filter that delays the detector output signal with respect to the sensor signal.

In a version of the embodiment, the fault detection portion includes a comparator that compares an amplified sensor signal to a reference signal, the delay filter being coupled to the output of the comparator.

In one embodiment, the device further comprises a housing including a front cover portion and a back body portion, the front cover portion including a user accessible portion having a manual test control input, a manual reset control input and at least one indicator portion, the at least one indicator portion providing at least one of a reset state, a trip state, or an operational status.

In one embodiment, the plurality of load terminals includes receptacle load terminals and feed-through load terminals that are decoupled in a tripped state.

In one embodiment, the device further comprises a circuit interrupter disposed between the plurality of line terminals and the plurality of load terminals, the circuit interrupter coupling the plurality of line terminals and the plurality of load terminals in a reset state and decoupling the plurality of line terminals and the plurality of load terminals in a tripped state, the tripped state being effected when the when the control voltage signal reaches the switch actuation voltage or when the control circuit effects the end-of-life state.

In a version of the embodiment, the protective electrical wiring device is configured to drive the circuit interrupter into the tripped state only during a predetermined half cycle polarity of the AC voltage source, and wherein the control circuit is configured to test the sensor portion or fault detection portion for an end-of-life condition in the predetermined half cycle polarity of the AC voltage source.

In one embodiment, the control circuit is configured to provide a second recurring test signal in place of the detector output signal in a second test of the series of tests, the second recurring test signal driving the conditioning circuit to provide a control voltage signal that is greater than or equal to the switch actuation threshold if the conditioning circuit is in an operational state, the switch element being configured to turn ON in response to the control voltage signal if the switch element is in an operational state, the control circuit storing a second test result in the test table indicative of whether the switch element turned ON within a second predetermined time frame.

In a version of the embodiment, the device further comprises a circuit interrupter assembly disposed between the plurality of line terminals and the plurality of load terminals, the circuit interrupter including a solenoid coil coupled to the AC power source in the AC electrical distribution system, the solenoid coil being energized to trip the circuit interrupter when the switch element is turned ON during a fault detection mode, the solenoid coil not being energized to trip the circuit interrupter when the switch element is turned ON during the second test.

In a version of the embodiment, the device further comprises a second switch element disposed in series between the switch element and the solenoid coil, the second switch element preventing the switch element from energizing the solenoid during the second test.

In a version of the embodiment, the second switch element includes a diode.

In a version of the embodiment, the control circuit is configured to monitor a switch voltage of the switch element during a third test in the series of tests, the control circuit storing a third test result in the test table indicative of whether the switch voltage was characterized by a predetermined polarity.

In one embodiment, the control circuit uses a signal pin as an input port to measure the value of the control voltage signal during a first test of the series of tests, and wherein the control circuit uses the signal pin as an output port to provide a second recurring test signal in place of the detector output signal in a second test of the series of tests.

In one embodiment, the device further comprises a power supply circuit disposed between a hot line terminal of the plurality of line terminals and the switch, the power supply circuit including a diode element disposed in series with the switch element, the diode being reversed biased during a negative half cycle of the AC power source, the control circuit being configured to monitor a switch voltage of the switch element during a third test in the series of tests, the control circuit storing a third test result in the test table indicative of whether the switch voltage was characterized by a positive polarity during the negative half cycle.

In one embodiment, the series of tests includes at least three different types of recurring tests.

In one embodiment, the switch element comprises a first switch and a second switch coupled to a circuit interrupter, the control voltage signal from the conditioning circuit being configured to turn the first switch ON to trip the circuit interrupter when there is a detected fault condition, the control circuit being configured to turn the second switch ON to trip the circuit interrupter when the end-of-life state is effected.

In a version of the embodiment, the first switch and the second switch are coupled to separate solenoids either of which trip the circuit interrupter when energized.

In one embodiment, the conditioning circuit includes a low pass filter.

In one embodiment, successive tests in the test cycle overlap one another.

In another aspect, the present invention includes a protective electrical wiring device that includes a plurality of line terminals and a plurality of load terminals configured to be coupled to an AC power source. A protective assembly includes a power supply, a sensor assembly, a multi-stage fault detection circuit and a switch actuator assembly. The sensor assembly is configured to provide at least one sensor signal corresponding to electrical signals propagating on the plurality of line terminals or the plurality of load terminals. The multi-stage fault detection circuit is configured to provide a detector output signal when the at least one sensor signal exceeds a predetermined threshold. The switch actuator assembly includes a filter circuit coupled to an electronic switch element, the filter circuit generating a control voltage signal in response to the detector output signal. The electronic switch actuator is configured to turn ON when the control voltage signal is greater than or equal to a switch actuation threshold. A control circuit is configured to automatically perform a test cycle from time to time, each test cycle comprising a series of tests that determine the operational state of the protective assembly. The control circuit is configured to perform a first test in a first half cycle of the AC power source. The control circuit generates a first test signal in the first test to exercise the sensor assembly, each stage of the multi-stage fault detection circuit, and the filter circuit. The control circuit measures the value of the control voltage signal to determine a first test result. The control circuit is configured to perform a second test, the control circuit generating a second test signal in the second test to exercise the filter circuit and at least a portion of the switch actuator assembly and monitor a switch actuator signal to determine a second test result. The control circuit is configured to effect or not effect an end-of-life state in response to an evaluation of at least the first test result or the second test result in accordance with a predetermined voting scheme.

In one embodiment, the multi-stage fault detector includes an amplifier, a comparator, a delay circuit, and an output buffer.

In one embodiment, the control circuit is configured to perform a third test in a third half cycle of the AC power source after the second half cycle, the control circuit monitoring the operational state of the electronic switch element and the power supply to determine a third test result.

In a version of the embodiment, the control circuit tests a power supply capacitor for a short circuit condition during the first test and an open circuit condition during the second test or the third test.

In one embodiment, the predetermined voting scheme provides a predetermined number of allowable test failures for each of a plurality of the first test results, a plurality of the second test results, or a plurality of results from a third test over a predetermined number of test cycles.

In one embodiment, the control circuit repeats the series of tests a predetermined number of times so that the control circuit evaluates a plurality of the first test results and a plurality of the second test results in accordance with the predetermined voting scheme.

In one embodiment, the control circuit terminates the first test signal when the control voltage signal reaches a test acceptance voltage within a predetermined time frame.

In one embodiment, the control circuit is configured to provide a second test signal in place of the detector output signal in the second test, the second test signal driving the filter circuit to provide a control voltage signal that is greater than or equal to a switch actuation threshold if the filter circuit is in an operational state, the electronic switch actuator being configured to turn ON in response to the control voltage signal if the electronic switch actuator is in an operational state, the control circuit storing the second test result in a test table indicative of whether the electronic switch actuator turned ON within a second predetermined time frame.

In one embodiment, the power supply circuit includes a diode element disposed in series with the electronic switch actuator, the diode being reversed biased during a half cycle of the AC power source, the control circuit being configured to monitor an anode voltage of the electronic switch actuator during a third test when the AC power source transitions from an immediately preceding half cycle to the half cycle, the control circuit storing the third test result in a test table indicative of whether the anode voltage maintained the polarity of the immediately preceding half cycle during the monitored half cycle.

In another aspect, the present invention includes a protective electrical wiring device that includes a plurality of line terminals and a plurality of load terminals configured to be coupled to an AC power source. A protective assembly includes a power supply, a sensor assembly, a multi-stage fault detection circuit, a filter circuit and a switch actuator assembly. A control circuit is configured to automatically perform a test cycle from time to time, each test cycle comprising a series of tests that determine the operational state of the protective assembly. At least one successive test overlaps a portion of a predecessor test. The control circuit is configured to generate a test signal in the first test, the sensor assembly and each stage of the multi-stage fault detection circuit being operational if the multi-stage fault detection circuit drives the filter circuit to provide a control voltage signal in response to the first signal. The control circuit terminates the first test signal when the control voltage signal reaches a test acceptance voltage, the test acceptance voltage being lower than a switch actuation threshold required to turn the switch actuator assembly ON. The control circuit determines a first test result indicative of whether the control voltage signal reached the test acceptance voltage within a predetermined time frame. The control circuit is configured to effect or not effect an end-of-life state after performing additional tests in the series of tests based on an evaluation of at least the first test result.

In one embodiment, the control circuit is configured to effect or not effect an end-of-life state based on a predetermined voting scheme that provides a predetermined number of allowable test failures for each type of test in the series of tests.

In one embodiment, the sensor assembly includes a plurality of toroidal sensors and the multi-stage fault detection circuit is configured to detect at least one fault of a group of fault conditions including a ground fault condition, a grounded neutral condition, or an arc fault condition.

In one embodiment, the multi-stage fault detection circuit includes a ground fault detection circuit and an arc fault detection circuit, the arc fault detection circuit being included in the control circuit.

In a version of the embodiment, at least one end-of-life condition in the arc fault detection circuit does not interfere with the ability of the control circuit to effect a test cycle or interfere with the ability of the device to interrupt a ground fault condition.

In one embodiment, the control circuit is configured to compare a test result to a predetermined successful test outcome for each test in the series of tests, each test result being an element of a test result table that includes all of the test results for all of the tests in the series of tests over a predetermined number of cycles, the control circuit being configured to effect an end-of-life state in accordance with a predetermined voting scheme that employs the elements of the test result table.

In one embodiment, the control circuit is configured to provide a second test signal to the filter circuit, the filter circuit providing a control voltage signal that is greater than or equal to a switch actuation threshold of the switch actuator assembly if the storage element is in an operational state, the switch actuator assembly being configured to turn ON in response to the control voltage signal if the switch actuator assembly is in an operational state, the control circuit storing a second test result indicative of whether the switch actuator assembly turned ON within a second predetermined time frame.

In one embodiment, the control circuit is configured to monitor a voltage indicative of a short circuit in a portion of the power supply during a third test in the series of tests, the power supply being non-operational when the short circuit is manifest, the control circuit storing a third test result indicative of whether the power supply is operational.

In a version of the embodiment, the control circuit is configured to monitor a voltage indicative of an open circuit in another portion of the power supply during the third test in the series of tests, the power supply being non-operational when the open circuit is manifest.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is a timing chart illustrating self-test scheduling in accordance with the present invention;

FIG. 4 is a timing chart illustrating GFI auto-test scheduling in conjunction with end-of-life decision making in accordance with an embodiment of the invention;

FIG. 5 is a detail version of the timing chart depicted in FIG. 3;

FIGS. 11A-11H are diagrammatic depictions illustrating the automatic multi-use miswiring detection features of the present invention.

DETAILED DESCRIPTION

Figure 1:
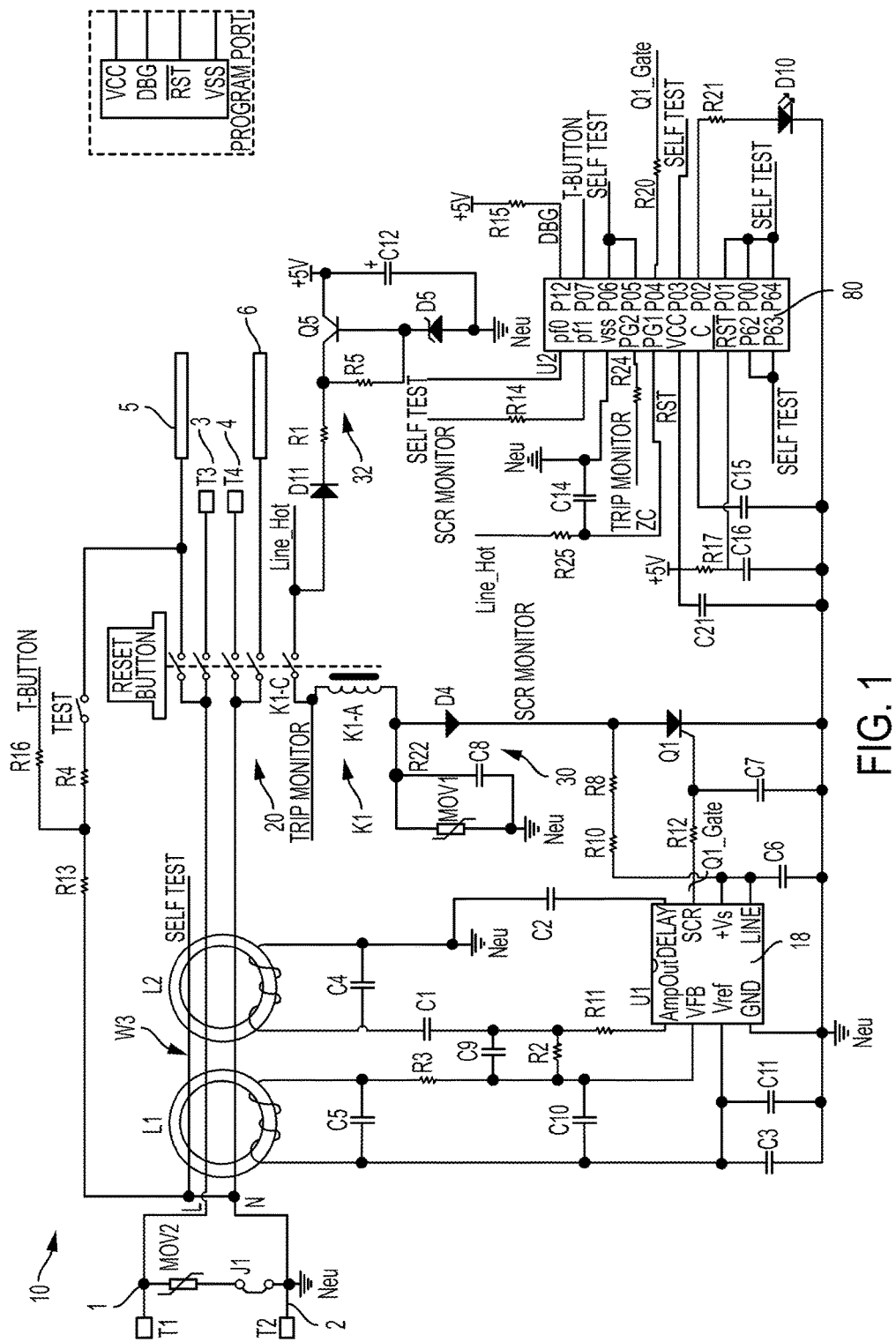
FIG. 1 is a schematic diagram of a protective device in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

As embodied herein, and depicted in FIG. 1, a schematic diagram of a protective device 10 in accordance with an embodiment of the present invention is disclosed. The device 10 includes a differential transformer L1 and a grounded neutral transmitter L2. The differential transformer L1 includes a secondary winding which is coupled to the fault detector integrated circuit 18 by way of noise filtering circuitry. The differential transformer L1 senses the current differential between the hot and neutral conductors and provides a sensor signal to the ground fault detector chip 18 via the (VFB, Vref) inputs. When the differential current (sensor signal) exceeds a predetermined threshold value, the fault detector 18 should cause the SCR output to go HIGH.

A grounded neutral condition occurs when the load neutral conductor is accidentally grounded to create a parallel conductive path (relative to the neutral return path) between the neutral line terminal 2 and neutral load terminal 4. The grounded neutral transmitter L2 is configured to sense this condition by coupling its sensor signal (from the parallel path) onto the neutral conductor (but not the hot conductor) to create a differential current that is sensed by the differential transformer L1. As before, when the sensor signal exceeds a predetermined threshold value, the fault detector 18 should generate the fault detection output signal.

The ground fault detector 18 receives power from a GFI power supply 30 circuit and is configured to detect actual ground fault conditions one half cycle of the AC line cycle. Specifically, a ground fault in the electrical distribution system will be detected by ground fault detector 18 in an interval (i.e., about 30°-90°) within the positive half of the AC line cycle. The detector 18 output signal (SCR) is provided in the middle of the AC line cycle (i.e., about 60°-120°) and is configured to turn the SCR Q1 ON. When SCR Q1 conducts in the middle of the AC line cycle, the solenoid K1A is energized so that the solenoid armature trips the circuit interrupter and the auxiliary switch K1C. Solenoid K1A remains energized for a time period that is typically less than about 25 milliseconds causing the circuit interrupter 20 to trip. Once the fault condition is resolved, K1A is no longer energized and the circuit interrupter may be reset by way of a mechanical reset button. Note that processor 80 is not used to detect ground faults, grounded neutral conditions or arc faults.

The processor 80 automatically and periodically initiates three tests that are used to test the operability of the GFCI. Briefly stated, when processor 80 determines that the GFCI circuit has failed any of the tests a predetermined number of times, the processor 80 is programmed to interpret this as an end of life condition. In the embodiment of FIG. 1, processor 80 is configured to trip the circuit interrupter by transmitting the Q1 Gate signal to turn the SCR Q1 ON during the positive half cycle (in order to energize solenoid K1A). The processor 80 indicates that the device is in an end-of-life state by causing the indicator LED D10 to flash. (Note also that the embodiment of FIG. 1 is able to indicate, but not interrupt, certain end-of-life conditions such as an open solenoid K1A or an open SCR Q1).

Protective device 10 includes two power supply circuits that operate independently. Both power supplies are half wave power supplies; neither supply is powered during the negative half cycle of the line voltage. The GFI power supply 30 includes diode D4, resistors R8 and R10, and capacitor C6. The diode D4 is connected to Line Hot by way solenoid K1A, which is in series with auxiliary switch K1C. The GFI power supply 30 provides power to fault detector 18 when the auxiliary switch K1-C is closed; i.e. when the device is in the reset state. Because of the way diode D4 is biased, diode D4 charges the capacitor C6 only during the positive half cycle of the AC line cycle. The capacitor C6 provides power to the detector chip, which is configured to detect faults during the positive half cycle of the AC line cycle. Capacitor C6 is also configured to function as a current source to the anode of SCR Q1 during the negative half cycle of the line cycle, when the SCR Q1 is auto-tested.

The second power supply 32 services the processor; and it includes diodes D11, zener diode D5, transistor Q5, resistors R1, R5, and capacitor C12. Current flows through diode D11 during the positive half cycle to charge capacitor C12. Unlike the fault detection power supply 30, the processor power supply 32 is directly connected to line hot, i.e., it is not connected via the auxiliary switch K1-C. Accordingly, the processor is powered and operational when the circuit interrupter contacts are tripped.

The GFI power supply 30 is disposed in series with the auxiliary switch K1C and the solenoid K1A. When the auxiliary switch K1C is closed, the inductance of the solenoid K1A (in combination with movistor MOV1 or capacitor C8) protects the GFCI circuitry from lightning surges that could otherwise damage it. The auxiliary switch K1C also protects the solenoid K1A if SCR Q1 shorts out, because the auxiliary switch K1C is configured to interrupt power to the GFCI circuit when the circuit interrupter 20 trips.

The auxiliary switch K1-C is connected to the processor 80 by way of the TRIP Monitor signal. (If the TRIP Monitor signal is HIGH, then the processor determines that the device is reset; if the signal is LOW, then processor 80 determines that the device is tripped). The device 10 also includes a red LED D10 that is coupled to pin 13 (P02) of the microprocessor 80. When the processor determines that the auxiliary switch is tripped, it is configured to turn LED ON with a steady light to provide trip indication. When an end-of-life condition is detected, the processor 80 causes LED D10 to emit a blinking light. The auxiliary switch K1C is disposed entirely on the Line side of the circuit interrupter 20 and therefore, the TRIP monitor signal does not directly monitor the status of the circuit interrupter contacts. The TRIP monitor signal is a proxy signal because, as noted above, it could show an absence of a Line Hot signal when the circuit interrupter contacts were in fact closed. (Thus, Trip Monitor is not used to detect a defective interrupting contact fault condition).

Device 10 includes automated self-testing that is implemented by, inter alia, test wire W3 and processor 80. The self-test circuit includes a third wire W3 that passes through the toroidal sensors L1 and L2. The third wire W3 is connected to a plurality of output pins of the processor 80 which are tied together to form the Self Test output. In one embodiment, the outputs of eight N-channel MOSFET CMOS transistors—internal to the processor 80—are connected in parallel to form the grounded neutral loop W3 that extends through the differential and grounded neutral toroids (L1, L2). The grounded neutral simulated fault is produced by turning on the transistor output ports to a LOW level at an appropriate time (as determined by processor 80).

One advantage for using the third wire W3 within the wire loop relates to improved noise immunity. Had the third wire been eliminated and a segment of the hot or new conductor used in its place, electrical noise or voltage drops in that segment would propagate a noise current in the loop. The noise current could impair the test fault signal and its detection by the GFCI detector 18. Usage of the third wire solves that problem by isolating the wire loop from the power conductors.

The processor 80 is also connected to other I/O lines in order to perform and monitor the three-step testing procedure. For example, the dual purpose Q1 Gate signal is connected to processor pin P04 and the gate filter (R12, C7) of the SCR Q1 gate. In the first test, the processor uses Q1 Gate to monitor the output of the detector 18. In the second test, the processor 80 uses Q1 Gate as an input to charge the Q1 Gate filter circuit. The processor pin Pf1 is connected to the anode of the SCR Q1 to monitor the SCR Anode (D4 cathode) during the second and third tests.

While the processor 80 monitors the auxiliary switch (TRIP Monitor signal) for trip detection and wiring state detection, it does not use the TRIP monitor signal for any self-test purposes. In other words, an end-of-life condition is not recognized on the basis of the TRIP monitor signal.

In one embodiment the microcontroller 80 may be implemented by a processor such as the Renesas R5F10266. The processor 40 provides a 1 MHz clock signal that is used for digital clocks and other internal timing signals. The processor 40 is a 16-bit microcontroller that is widely used in embedded processor designs. The processor 40 includes 2 kB ROM to store the firmware and 2 KB Flash memory to implement the wiring state register. In another embodiment of the invention, the processor 80 is implemented using a Fujitsu MB 95f564k processor. This processor is a 20 pin device and includes an 8 bit processor having a 1 MHz clock, 20 kB of ROM and 496 B of flash memory.

It will be apparent to those of ordinary skill in the pertinent art that modifications and variations can be made to the processor 80 of the present invention depending on the degree of processing sophistication. The embedded processor 80 includes on-board memory that typically includes random access memory (RAM) and read only memory (ROM). The embedded processor 40 functions may be implemented using hardware, software, embedded processors, signal processors, RISC computers, application specific integrated circuits (ASICs), field programmable gate array (FPGA) devices, gate array state machines, customized integrated circuits and/or a combination thereof. The RAM memory may have battery back-up. Thus, the embodiments of the present invention are not limited to any specific combination of hardware circuitry and/or software. Taken together, RAM and ROM may be referred to herein as "computer-readable media." The term "computer-readable medium," as used herein, refers to any medium that participates in providing data and/or instructions to the processor for execution. For example, the computer-readable media employed herein may include any suitable memory device including SRAM, DRAM, NVRWM, PROM, E$^2$PROM, Flash memory, or any suitable type of memory. The Flash memory or RAM with battery back-up are examples of non-volatile memory that is provided herein to store the wiring state of the device for multi-use miswire purposes.

Figure 2:
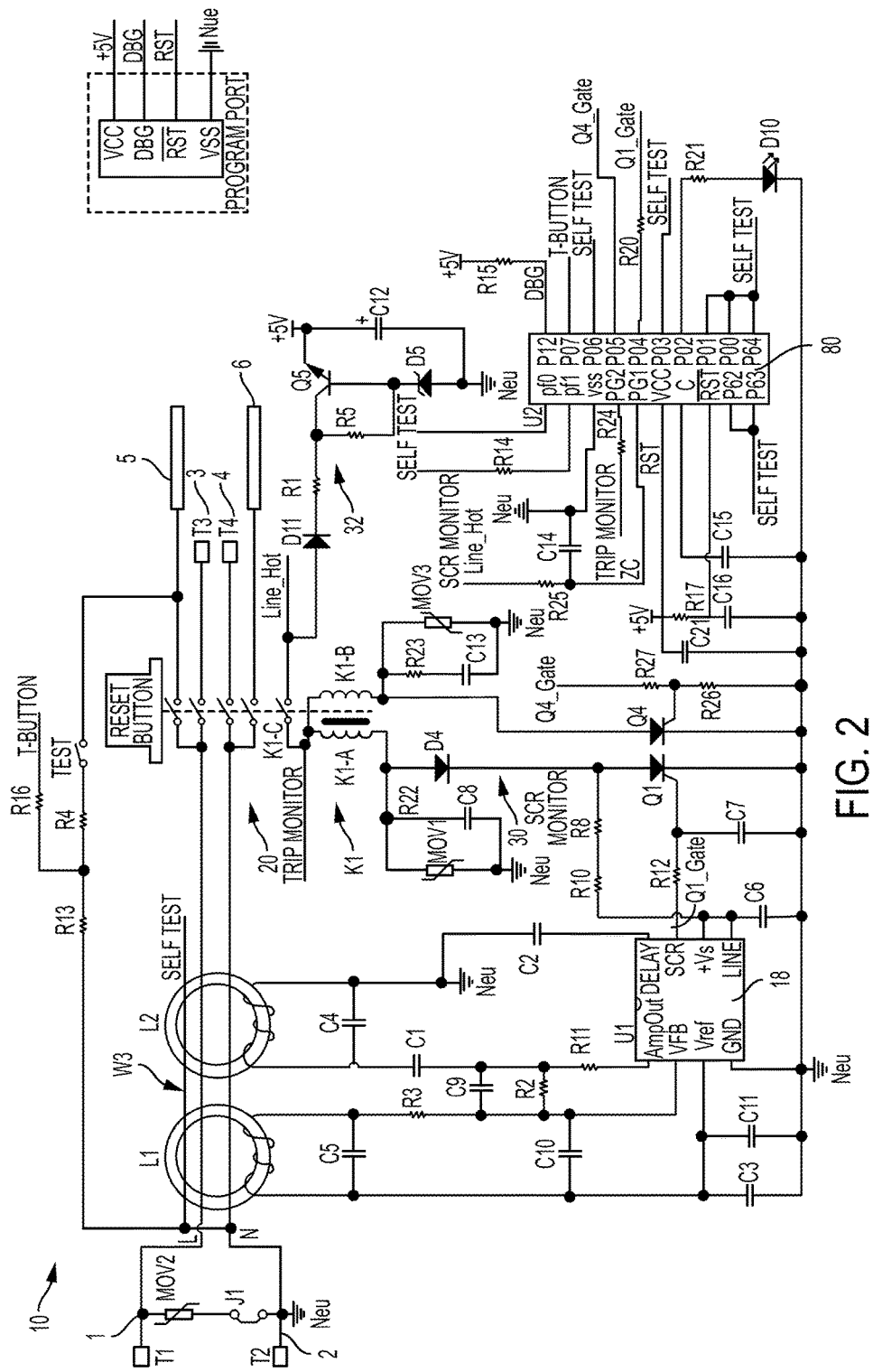
FIG. 2 is a schematic diagram of a protective device in accordance with another embodiment of the present invention.

Referring to FIG. 2, a schematic diagram of a protective device 10 in accordance with another embodiment of the present invention is disclosed. This embodiment is very similar to the embodiment depicted in FIG. 1; one difference between the two embodiments relates to the fact that the embodiment of FIG. 2 includes a second solenoid K1B that is also connected to line hot via auxiliary switch K1C. In the dual-solenoid version of FIG. 2, the device 10 is configured to be tripped by a redundant SCR Q4 and a redundant solenoid K1B when the device enters an end-of-life (EOL) state (i.e., a major system failure is detected and the device is thus no longer protective). To be specific, the processor 80 responds to an EOL state by turning SCR Q4 ON during the positive half cycle to energize the redundant solenoid K1B. The processor 80 indicates that the device is in an end-of-life state by causing the indicator LED D10 to flash. Again, when the auxiliary switch K1C is closed, the inductance of the solenoid K1B in combination with movistor MOV3 or capacitor C13 protect the GFCI circuitry from lightning surges that could otherwise damage it. The auxiliary switch K1C also protects the redundant solenoid (in the dual solenoid embodiment) if SCR Q4 shorts out.

Referring to FIG. 3, a timing chart 300 illustrating self-test scheduling in accordance with the present invention is disclosed. The waveform 302 shows the AC line. The next waveform 304 provides negative half cycle pulses: i.e., the AC line cycle is divided into 8.33 millisecond (mS) half-cycles, wherein the positive half-cycle is implemented as an 8.33 mS LOW signal and the negative half-cycle is implemented as an 8.33 mS HIGH pulse. The third waveform 306 illustrates the processor's scheduling of three separate self-tests (308, 310, 312) over three consecutive half cycles. Once these tests are performed, the processor 80 waits a delay period 314 (approximately one second) before repeating the tests.

In the first step of the automated test process, therefore, a simulated grounded neutral test 308 is performed during the positive half cycle of the AC line cycle to test the GFI (i.e., the sensors L1/L2 and detector chip 18). The second test 310 is directed to testing the operability of the SCR Q1, and this test is performed in the subsequent negative half cycle of the AC line cycle. The third test 312 of the auto-test process determines if the half-wave rectifier diode D4 is operating properly and this test is performed in the next positive half cycle after the second test. Briefly then, a three step auto-test cycle is performed over three consecutive half cycles. Once an auto-test cycle is completed, the processor 80 waits about one (1) second before the next three step auto-test cycle is performed. Thus, in one embodiment, automatic self-testing is performed every second.

Referring to FIG. 4, a timing chart 400 illustrating GFI auto-test scheduling in conjunction with end-of-life decision making in accordance with an embodiment of the invention is disclosed. This chart illustrates that the decision for deciding that an end-of-life condition has occurred in the GFI portion is based on multiple test results. The use of multiple tests avoids nuisance tripping (relying on a single test for sensitive circuitry can be problematic). In this embodiment, the processor 80 is programmed or configured to take into account up to ten (10) GFI test results before declaring that the GFI portion of the device is at end-of-life. GF tests 401 through 410 denote the ten individual tests. If GF test 401 fails, the processor deems it a "probationary failure." If at least one subsequent GF test among 402 through 410 passes, the probationary failure status is cancelled and the ground fault portion of the device is deemed operational. In an alternate embodiment processor 80 is programmed or configured to recognize patterns of passing and failing tests subsequent to the probationary test failure. By way of non-limiting example the test failure may be ignored if a predetermined percentage of those subsequent tests pass, at least two consecutive tests pass, or may be confirmed if at least two consecutive tests fail. Processor 80 may be programmed to ignore certain test results following the probationary failure, e.g. ignore what happens in GF test 402.

In a similar manner, processor 80 determines whether the SCR test or the diode test has truly detected an end-of-life condition on the basis of multiple test results. The numbers of multiple tests need not be the same: In an embodiment of the invention, the processor 80 can consider up to ten (10) GFI test results, three (3) SCR test results and three (3) diode test results following respective ground fault, SCR, or diode probationary failures. (In other words, for example, the processor 80 may be configured to attempt the SCR test three (3) times before declaring that the SCR is at end-of-life. Similarly, in another embodiment, the processor 80 may be configured to attempt the diode test three (3) times before declaring that the power supply diode D4 is at end-of-life). If there is an end-of-life determination in any of the three test portions, the processor 80 will conclude that the entire GFCI is in an end-of-life condition.

Referring to FIG. 5, a detailed version of the timing chart depicted in FIG. 3 is disclosed. The first test (GFI test) is performed in time frame 510 and is allotted approximately 4.1 mS. To be specific, the processor 80 turns ON at least one CMOS transistor (in one embodiment, there are eight) to generate a simulated grounded neutral condition at the start of the positive half cycle (i.e., there is a zero (0) msec delay from the zero cross point 506). The CMOS transistor(s) drive the Self Test output pin to close the wire loop W3, creating the simulated grounded neutral test condition. Transformers (L1, L2) are now magnetically coupled by virtue of the wire loop and, together with detector 18, comprise a positive feedback loop. As a result, the ground fault circuit breaks into oscillation. In response to the oscillating flux in the grounded neutral transformer L2, a current in the wire loop L3 is generated. In response to the current on the wire loop, the differential transformer L1 provides an oscillating signal to the detector chip 18. Detector chip 18 amplifies the oscillating signal and directs it back to the grounded neutral transformer L2 to thus complete the positive feedback path.

The detector chip 18 includes an internal operational amplifier circuit that has an output coupled to the SCR output pin. During the simulated grounded neutral test, the output signal (at the SCR output pin) charges the capacitor C7. Because the SCR output pin is also connected to the Q1 Gate pin of the processor 80, the detector output is also monitored by the processor 80. Once the voltage on Q1 Gate reaches 112 mV, the processor 80 concludes that the GFI test has been successfully completed, and immediately turns the at least one CMOS transistor OFF to open the wire loop W3. With the wire loop W3 opened, the simulated grounded neutral condition is removed and the oscillation terminates. At this point, the magnetic flux in transformer L1 begins to decay so that the input signal provided to the detector 18 (and consequently the SCR output pin) disappears before the voltage on the gate of SCR Q1 reaches the turn on voltage of about 0.6 Volts. If a true grounded neutral or ground fault occurs during the test, the detection signal endures so that the voltage on the gate will reach the 0.6 V threshold. As such, the first test does not take GFCI protection "off line" while it is being performed. The same holds true for the other two tests.

All told, the processor 80 is programmed to monitor Q1 Gate for about 4.1 mS. In other words, if processor 80 does not see 112 mV before the 4.1 msec test frame elapses; it concludes that the GFI test was a failure. If, on the other hand, the processor 80 does read 112 mV within the 4.1 msec window, then the GFI test is deemed to be successful. In either case, the processor 80 terminates the Self Test signal no later than 4.1 msec from the start of the positive half cycle. The ground fault circuit test 510 occurs early in the positive half cycle because it requires several milliamperes from power supply 30 to simulate the grounded neutral condition. And the power supply 30 is biased to conduct during the positive half cycle, and is thus capable of providing the requisite current.

The second test is performed within "window" 512 and it occurs at the beginning of the negative half cycle of the AC line cycle to prevent nuisance tripping. Specifically, this test requires that SCR Q1 be turned ON without energizing the solenoid K1A. This is achieved by the biasing of diode D4; the power supply diode D4 is reverse biased during the negative half-cycle so that the SCR Q1 is electrically isolated from the solenoid K1A during the test. (This test demands less than 1 mA, which is supplied by capacitor C7).

In the second test 512, the processor 80 is configured to employ the Q1 GATE pin as an output (instead of as an input signal per step one). Specifically, processor 80 drives the Q1 Gate pin at the positive-to-negative zero crossing to charge the filter capacitor C7. The capacitor C7 is charged to the SCR gate trigger voltage (about 0.6V) at about 0.9 msecs into the negative half cycle. If the SCR is operational, it will conduct and processor 80 will read a LOW state on the SCR MONITOR input pin within the timing window 512 (between 2 msec and 6.9 msec) after the negative zero crossing. If the processor 80 does not detect the LOW state within this period, it is programmed to conclude that the second test step failed (i.e., the SCR may be open circuited). Thus, the test is repeated in time windows 514 and 516. If these additional two tests fail, then the processor may be programmed to indicate that the SCR Q1 is at end-of-life. In an embodiment of the invention, the processor must detect a HIGH state before detecting the LOW state must be within this period. Alternatively, the processor 80 may be configured to detect the transition from a HIGH state to a LOW state to pass the test.

Figure 6:
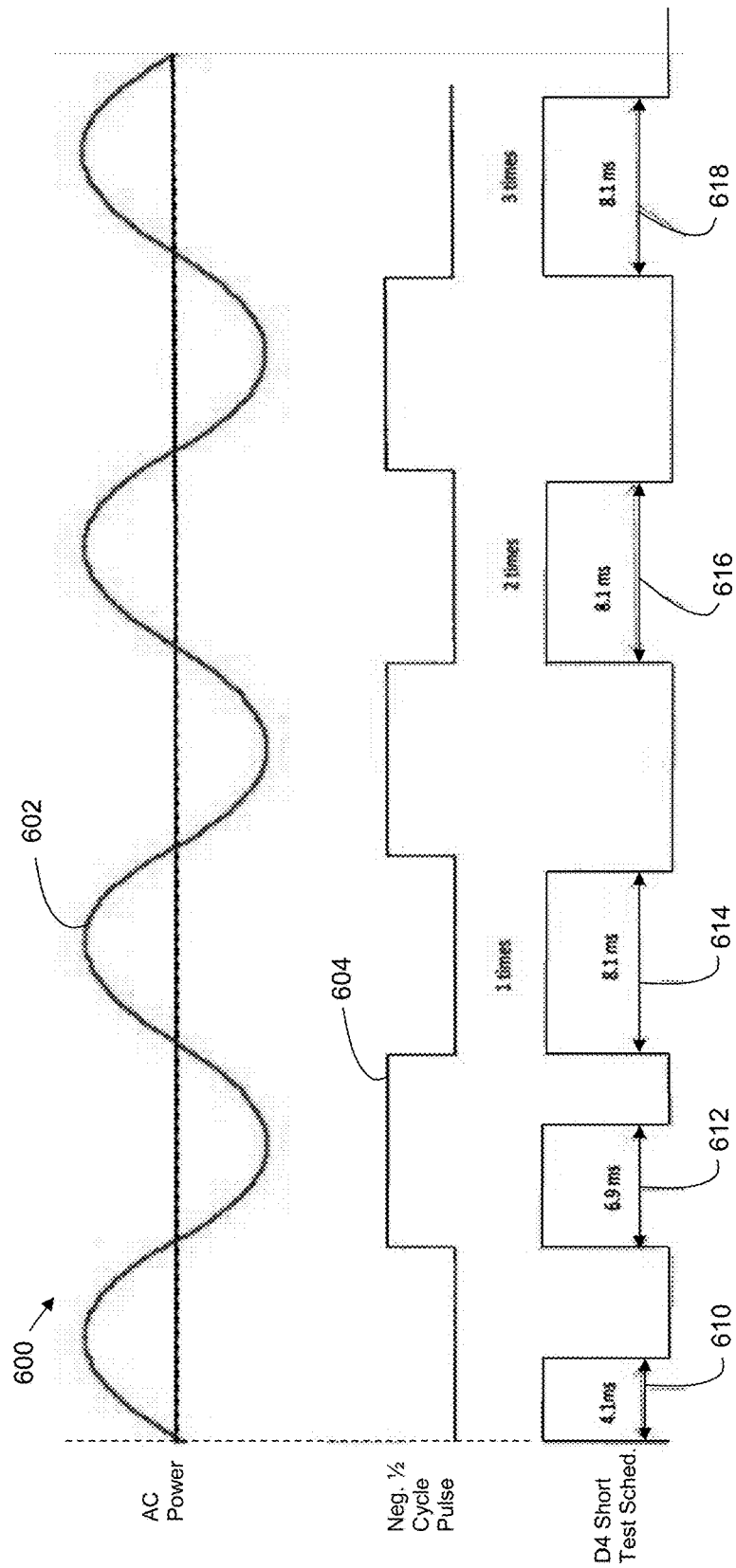
FIG. 6 is another detail version of the timing chart depicted in FIG. 3.

Referring to FIG. 6, another detail version of the timing chart 600 depicted in FIG. 3 is disclosed. As before, the first horizontal line shows the AC line cycle waveform 602. The next waveform 604 provides negative half cycle pulses: i.e., the AC line cycle is divided into 8.33 millisecond (mS) half-cycles, wherein the positive half-cycle is implemented as an 8.33 mS LOW signal and the negative half-cycle is implemented as an 8.33 mS HIGH pulse. The third line illustrates the processor's scheduling of three separate self-tests over three consecutive half cycles. As described above, the GFI test is performed in window 610 and the SCR operability is tested in window 612. The third test, i.e., the power supply test, is performed in the third window 614.

To be specific, in the third step of the auto-test (614), the processor 80 again monitors the anode of the SCR Q1 by way of the SCR Monitor pin (pf1) to determine if the diode D4 is operational. The third auto-test takes place after 8.1 msec of the positive half-cycle has elapsed and continues into the negative half-cycle. The processor 80 reads the SCR Monitor pin during the test interval to determine if the SCR Monitor signal goes LOW immediately at the zero crossing. If it does, the processor determines that the diode D4 has short circuited. Stated differently, there should be a residual voltage on the SCR anode (from capacitor C6) at the zero crossing that should decay to zero sometime during the negative half cycle. If that residual voltage immediately goes to zero at the zero crossing, one possibility is that C6 is open. Another is that the charge on C6 was conducted through a reverse biased diode D4, something that would happen if the diode D4 was shorted. Thus, the third test is used to evaluate C6 and D4.

Referring back to FIGS. 1-3, the processor 80 is configured to increment three counters, one for each test in the three-step auto-test cycle described above in conjunction with the embodiments of FIGS. 3-6. If the GFI test fails ten (10) consecutive times, the GFI portion of the device is deemed to be at end-of-life. On the other hand, if either the SCR or the diode D4 fail their respective tests three (3) consecutive times, processor 80 will determine that they are at end-of-life. Even if only one of the three circuit portions are determined to be at end-of-life, the processor 80 will conclude that the entire GFCI is in an end-of-life state. The present invention should not be limited to the "10-3-3" test failure regimen disclosed immediately above; other regimens may also be employed depending on the desired sensitivity of the self-testing.

Once the processor 80 determines that the GFCI is non-operational, the processor is programmed to take certain actions. In the two-solenoid version of device 10, the processor 80 will trip the device using redundant solenoid K1B. In the one solenoid version (FIG. 1), solenoid K1A is used to trip the device. If either SCR Q1 or solenoid K1-A have failed, then obviously, the device will be unable to trip. In both versions, the indicator light LED D10 is energized to provide EOL indication. In an embodiment of the invention, LED D10 indicates the EOL condition before the circuit interrupter trips providing an early warning that power is about to be denied. In another embodiment of the invention, the LED provides early warning indication except when power is applied to the device, at which time the LED indication and the circuit interruption are substantially simultaneous. In another embodiment, an annunciator is included to provide an audible indication, with or without additional LED indication.

Figure 7:
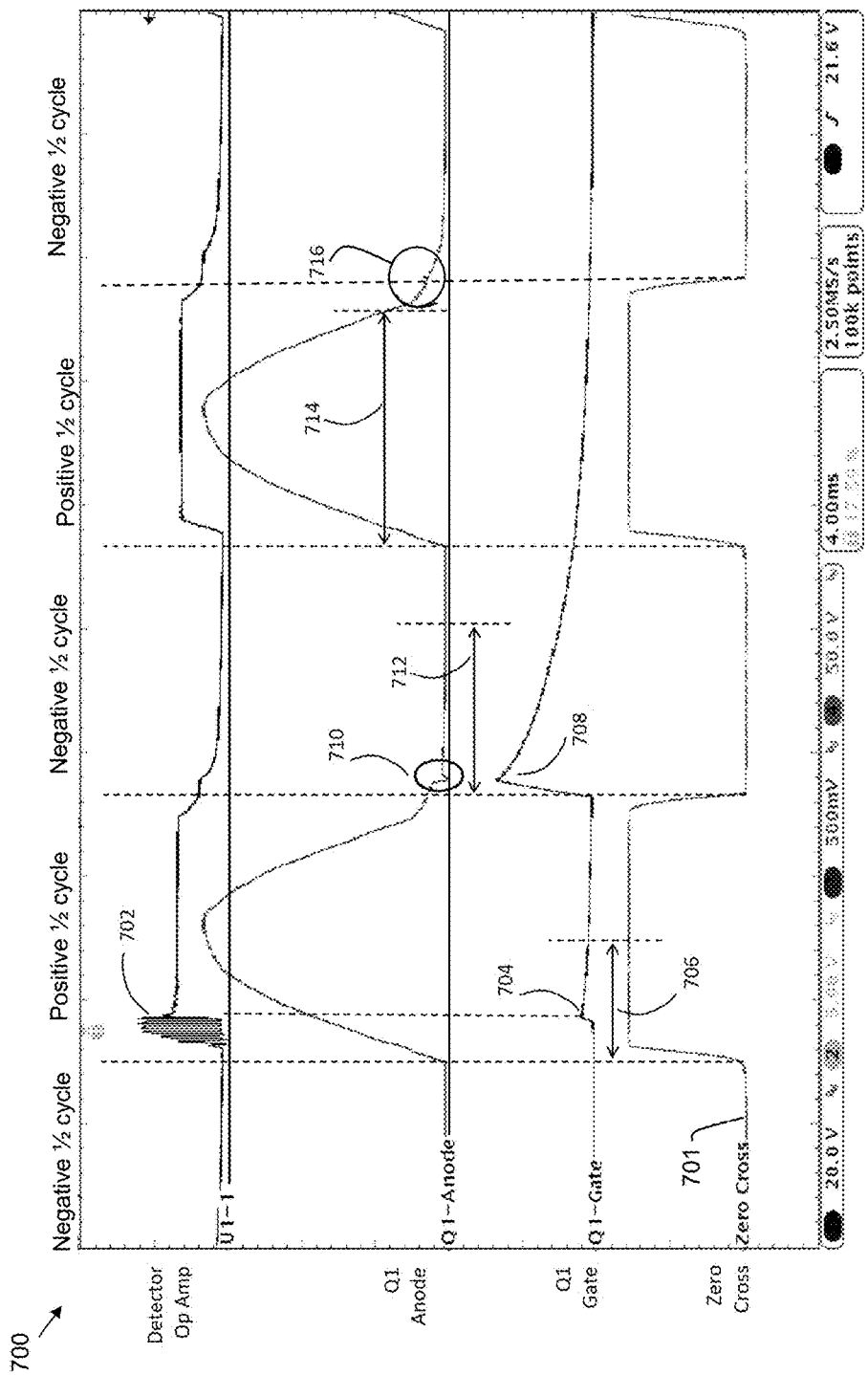
FIG. 7 is a chart showing detection and SCR triggering waveforms associated with the circuit depicted in FIGS. 1 and 2.

Referring to FIG. 7, a chart 700 showing detection and SCR triggering waveforms associated with the circuits depicted in FIGS. 1 and 2 is disclosed. As noted above, the auto-testing includes three discrete testing stages that, taken together, test the entire apparatus. The signals depicted in chart 700 are used herein to explain the test stages.

The first waveform 702 corresponds to the signal "detector Op Amp" at pin 1 of the detector 18. Prior to the zero cross waveform 701 transitioning from the negative half-cycle to the first positive half-cycle shown in the chart 700, the Op Amp waveform 702 is about at zero due to the fact there is little or no power supply voltage U1 pins (+Vs, Line.) After the transition, waveform 702 shows that a grounded neutral oscillation has commenced at or near the start of the positive half cycle. The fault detector 18 may be implemented using a Fairchild 4141A detection device. This device amplifies the differential current signal between U1 pins (VFB, Vref) and provides the amplified signal to a window comparator stage (see pin 8 at Cap Delay output). The resultant signal is directed to a buffer stage that provides the SCR trigger output (at pin 7). Because the present invention tests the entire detection chip 18, the amplified differential signal 702 (monitored at pin 1; Detector Op Amp) causes the SCR trigger at detector pin 7 to charge the capacitor C7 (shown at FIG. 1) to a pre-determined voltage 704. (The SCR trigger signal is the Q1 Gate processor input in the first test stage). Once the processor 80 determines that capacitor C7 was able to be charged to the pre-determined voltage, the processor 80 terminates the simulated grounded neutral condition. Specifically, the processor 80 monitors the Q1 Gate voltage at the end of time interval 706 to determine if the ground fault detection circuit test has passed the first testing stage. Note that this test also tests the functionality of capacitor C6. Specifically, if capacitor C6 is shorted, then detector 18 will be disabled; as a result, the detector Op Amp signal (pin 1) and the detector output signal (pin 7) will not be provided and the first test will fail. If the first test stage passes, then the processor 80 is assured that, inter alia, the toroids L1/L2, the feedback circuitry, the entire detector chip 18, capacitor C6 and capacitor C7 are functional.

The second stage of the auto-test, the SCR test, commences in the next negative half-cycle. In this test, the processor 80 employs the Q1 Gate signal as an output; specifically, the Q1 Gate waveform 708 is driven HIGH by the processor 80 to turn the SCR Q1 ON. Of course, since the AC waveform is in its negative half cycle, the power supply diode D4 is reversed biased so that current cannot flow from the Line hot to energize the solenoid K1-A. Instead, the current is provided by capacitor C6, which was charged up during the previous positive half cycle. Thus, when the SCR Q1 turns ON, current flows from capacitor C6, through resistors R6 and R10, and through the SCR Q1. Thus, the small amount of voltage 710 on the anode of the SCR Q1 at the positive-to-negative zero crossing is provided by capacitor C6 (the SCR anode is monitored by the processor 80 via the signal input "SCR Monitor"). Referring again to waveform 710, the Q1 anode voltage collapses when the SCR Q1 turns ON, but immediately rises when SCR Q1 turns OFF. (In reference to waveform 708, the processor 80 is programmed to turn SCR Q1 ON for a moment. As soon as Q1 Gate turns Q1 ON, the processor stops charging capacitor C7, thus Q1 is not ON long enough to fully discharge capacitor C6). Q1 anode voltage is checked during the interval 712 for the transition waveform 710 to determine whether the SCR test passed. If the second test stage passes, then the processor 80 "knows", among other things, that at least capacitor C6, capacitor C7, and SCR Q1 are functional.

The third test stage occurs during the positive half-cycle. Specifically, the processor 80 is programmed to delay reading the voltage of the SCR Monitor signal by a time delay interval 714 until late in the positive half cycle. Once the zero-crossing occurs, the processor checks the polarity of the Q1 anode voltage (SCR Monitor pin) early in the negative half cycle during time frame 716 (while monitoring the Q1 gate signal for a detector output signal on pin 7; if Q1 Gate is HIGH, it means that there is a true fault condition). If the voltage is positive it means that capacitor C6 is working (i.e., providing enough voltage to keep 716 at a positive voltage), the power supply diode D4 is reverse-biased (i.e., blocking the AC line cycle which goes negative) and that SCR Q1 has not shorted; and thus, the third test passes when voltage 716 is positive. If the voltage on the SCR monitor signal is negative, then power supply diode D4 has shorted out and is thus at end-of-life. If the anode voltage is at ground, then either C6 or SCR Q1 has shorted out and are at end-of-life (unless Q1 is responding to a true fault). (If the processor 80 determines that the device is responding to a true fault condition, it typically disregards the test results for the third phase). If the third test stage passes, however, then the processor 80 "knows" that at least capacitor C6, power supply diode D4, and SCR Q1 are functional.

As described herein, the series of tests overlap each other so that various components—especially those involved in fault actuation—are tested more than once to provide test redundancy. For example, capacitor C6 is tested by all three tests. SCR Q1 is checked by the final two tests. Capacitor C7 is tested twice. During the first test stage, the processor 80 determines if the capacitor is capable of being charged in response to an output signal from detector 18. The capacitor is not charged to effect the SCR Q1 turn-on voltage since that would cause a nuisance trip. During the second stage test, capacitor C7 is charged to effect the SCR Q1 turn ON voltage. The redundant tests that are employed herein, test these components in different ways to reveal different of end-life-modes that they could experience. By way of example, if C6 is experiencing a shorted condition the first test stage will detect it (since there would be no detector output voltage.) On the other hand, there would be output voltage if the capacitor C6 is open; thus, the first test stage may not detect this failure mode. On the other hand, both the second test and the third test would pick up this mode by virtue of the fact that there would be no power supply voltage during the negative half cycle. With respect to capacitor C7, the first test determines if the fault detector is functional and capable of charging the capacitor C7, and further determines if capacitor C7 can hold a charge. The second test determines whether capacitor C7 is capable of being fully charged (i.e., is not leaky) and determines that capacitor C7 is in tolerance and does not have a capacitance tolerance drift (by virtue of the fact that the capacitor must reach the actuation voltage within a predetermined time frame.) Even though the test sequence involves multiple tests, the process of "overlap" causes the protective test to be performed so that processor 80 can accurately ascertain the protective assembly's capabilities for sensing, detecting and interrupting true fault conditions. Moreover, the three-phase test cycle evaluates each and every signal pathway during testing.

In another embodiment of the invention, processor 80 measures the interval from the zero crossing to SCR turn-on. Since this interval is directly related to the capacitance value of C7 (the characteristic delay time of the low pass noise filter) is evaluated. If capacitor C7 is found to be out of tolerance, processor 80 may be programmed to flag this condition as another end-of-life condition. If the capacitance is lower than it should be, for example, the device may be nuisance tripped repeatedly. If the capacitance is greater than it should be, or the charging interval takes longer than it should for whatever reason, the interrupter may not trip when it should. Thus, an out of tolerance capacitor C7 may be considered as an end-of-life condition.

Thus, the processor 80 is configured to automatically perform the test cycle from time to time, in accordance with the charts depicted in FIGS. 3-7. Each test cycle comprises a series of tests that determine the operational state of the protective assembly. Each successive test in a cycle is configured to test at least a portion of the protective assembly tested by a predecessor test; the overlap assures the each portion of the protective circuit (see FIGS. 1-2) is tested. As shown herein, the processor 80 is configured to compare each test result to a predetermined successful test outcome for that test. Each test result may be stored in a test result table in memory. The processor 80 is also configured to effect or not effect an end-of-life state by evaluating at least a portion of the test results stored in the test result table in accordance with the predetermined voting scheme depicted in FIGS. 3-6. For example, the first test that determines the operational state of the sensor, fault detector and filter circuit (including capacitor C7), may be allowed to fail up to eight times before the processor 80 declares an end-of-life state. The second test may be allowed to fail up to three times. The third test may also be allowed to fail up to three times. However, the present invention should be construed as being limited to these so-called allowable-test failure numbers.

Figure 8:
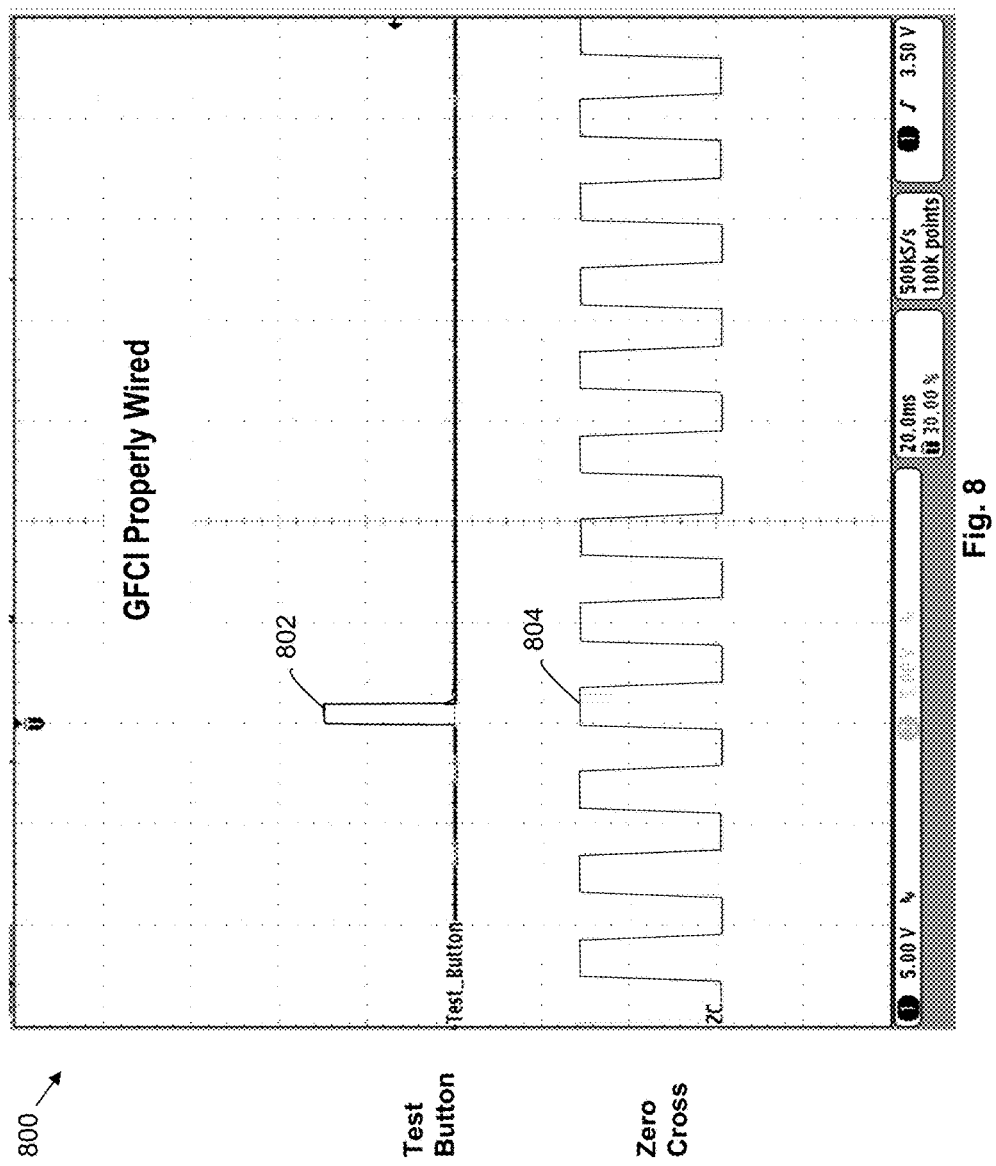
FIG. 8 is a chart showing wiring state detection waveforms associated with the circuit depicted in FIGS. 1 and 2 in a proper wiring state.

Referring to FIG. 8, a chart showing wiring state detection waveforms associated with the circuit depicted in FIGS. 1 and 2 in a proper wiring state is disclosed. Miswire detection—both when the receptacle is initially installed and later on if the device is removed from the installation and then re-installed—is mostly performed by the processor 80. Specifically, miswire detection during re-installation is performed by the processor 80 in conjunction with the TRIP Monitor signal and the zero cross (ZC) signal, which is actually a scaled version of the LINE HOT signal.

When a user depresses the test button, the T-Button conductor will be connected to load hot causing a logic HIGH pulse 802 to be transmitted to pin 7. The microprocessor is programmed to read this pulse as an interrupt request to monitor the ZC signal on pin 1 (or PG1) for zero crossings 804 in the AC line cycle. When the user depresses the test button, another event is set in motion—the load hot is also connected to line neutral to generate a simulated ground fault condition. If the GFI is operational, the simulated ground fault will be detected and the device will trip. Thus, a depression of the test button should simultaneously generate a T-Button pulse and a simulated fault, with a tripping action soon to follow. Even though interrupting contacts 20 have opened, zero-cross signals 804 persist. Processor 80 interprets the ongoing signal as the device being properly wired.

Whether initial installation or multi-shot, the processor 80 uses a one-bit non-volatile memory that is referred to herein as the wiring state register (or as the Miswire Flag), because it stores the wiring state of the device. The processor stores a ZERO (0) in the wiring state register when a proper wiring condition is detected, and stores a ONE (1) when the device is miswired, i.e., it sets the MISWIRE Flag. Thus, when the processor reads a ZERO from the wiring state register, it allows the circuit interrupter 20 to be reset because it assumes that the GFCI is properly wired; but if the processor 80 reads a ONE, the processor 80 will trip the circuit interrupter because it assumes that the device is miswired. Moreover, the processor 80 will continually trip the circuit interrupter until the GFCI is properly wired and the Miswire flag is cleared (i.e., a ZERO) is written to the wiring state register. (When the device 10 is being manufactured, one of the final assembly steps before the device enters the stream of commerce is to set the Miswire flag by writing a logic ONE into the wiring state register.

When the device 10 is installed and AC power is applied to the device, the circuit interrupter will trip (if not in the tripped state already) due to the ONE value (Miswire Flag=set) stored in the one-bit wiring state register). The tripping action is detected by the processor 80 by monitoring the state of the auxiliary switch via the TRIP Monitor signal. When the processor detects the TRIP Monitor signal transitioning from a HIGH to a LOW state, the processor is configured to jump to a zero cross monitoring routine. When the zero crossings 904 continue after the circuit interrupter has tripped, the processor determines that the device is properly wired and clears the Miswire Flag (by writing a logic ZERO into the wiring state register).

Figure 9:
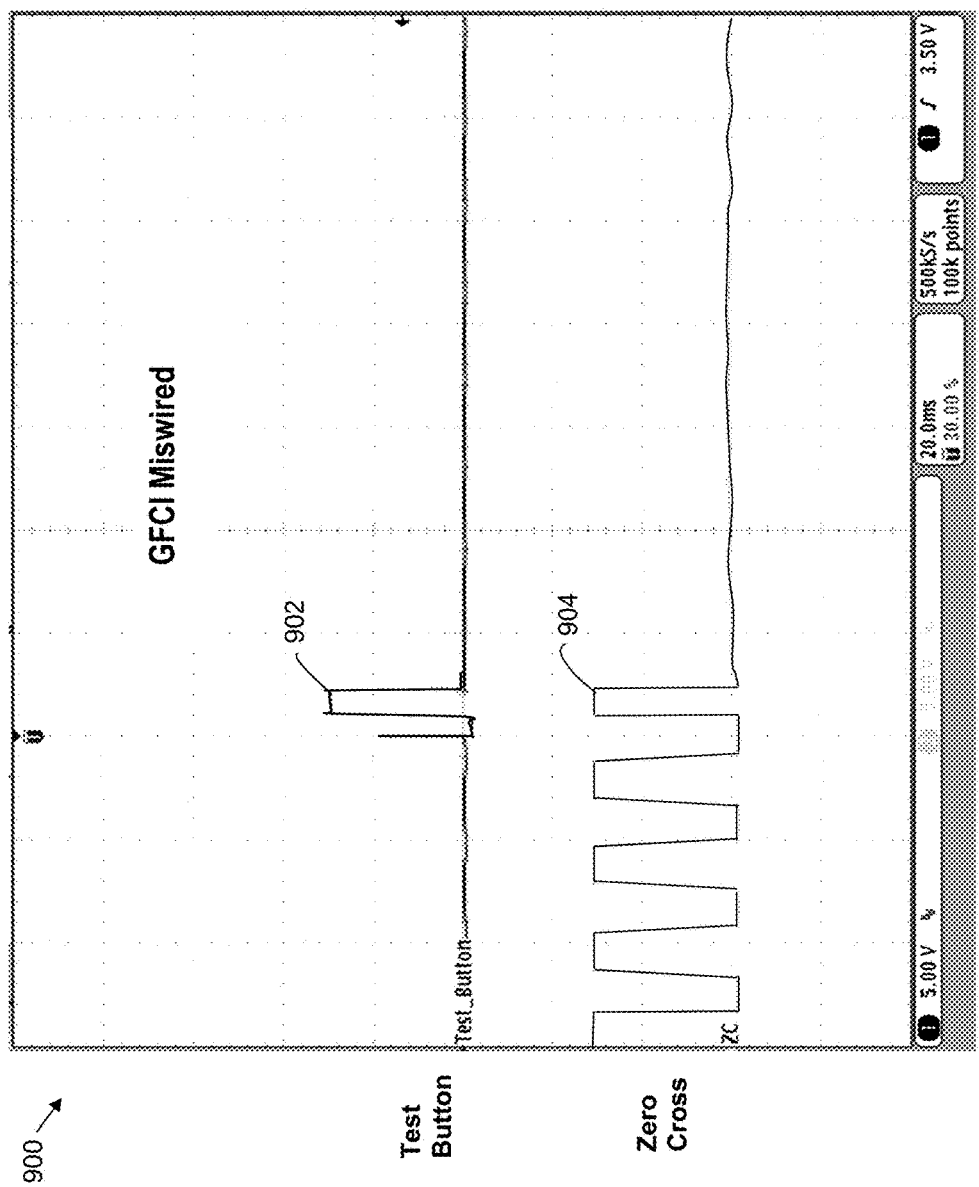
FIG. 9 is a chart showing wiring state detection waveforms associated with the circuit depicted in FIGS. 1 and 2 in a miswiring state.

In reference to FIG. 9, a chart showing wiring state detection waveforms associated with the circuit depicted in FIGS. 1 and 2 in a miswiring state is disclosed. Multi-shot miswire refers to detecting miswiring after a device has been installed, removed and reinstalled. After reinstallation, the user is instructed to actuate the test button immediately after the device 10 is reinstalled, reenergized and reset (if it is not reset already) so that the wiring state of the reinstalled device can be determined.

The waveforms are similar to those shown in FIG. 8 except that in this case, when the circuit interrupter 20 trips in response to the test button pulse 902, the zero cross pulses 904 cease. Since the processor 80 does not detect any zero cross pulses 904, then the processor 80 determines that the device is miswired and the Miswire Flag remains set (the logic ONE value remains in the wiring state register). Each and every time device reset is attempted, the processor will read the Miswire Flag, detect the miswire condition, and trip the device. The Miswire Flag must be cleared before the device can be reset.

When a user depresses the test button, the T-Button conductor will be connected to load hot causing a logic HIGH pulse to be transmitted to pin 7. The microprocessor is programmed to read this pulse as an interrupt request to monitor the ZC signal on pin 1 (or PG1) for zero crossings in the AC line cycle. When the user depresses the test button, another event is set in motion—the load hot is also connected to line neutral to generate a simulated ground fault condition. If the GFI is operational, the simulated ground fault will be detected and the device will trip. Thus, a depression of the test button should simultaneously generate a T-Button pulse and a simulated fault, with a tripping action soon to follow. If the AC line signal does not persist after the T-button interrupt, the processor determines that the device is miswired and sets the Miswire flag (i.e., writes a logic ONE in the wiring state register). Each time reset is attempted thereafter, the processor trips the circuit interrupter. On the other hand, if the device is properly wired and operational upon when the test button is depressed, the processor will detect the zero crossings and clear the Miswire flag (write a Logic ZERO in the wiring state register).

Briefly, processor 80 monitors the auxiliary switch, line hot, and the test button (T-Button) during the multi-shot detection routine. There are several reasons for using these signals. If, e.g., the device is removed from service with a logic ZERO value (i.e., Miswire Flag clear) in the wiring state register and is subsequently reinstalled in a reset and miswired state, the GFCI would read the cleared Miswire flag (logic zero) and assume that the device was properly wired. The above sequence involving the T-button signal and the ZC signal ensures that proper miswire detection is performed. The only caveat is that the test button must be actuated once after reinstallation and reset to ensure that the multi-shot miswire detection procedure has been performed. In one embodiment, the processor monitors both line hot and the aux switch in order to distinguish momentary power loss from device tripping; both signals are absent during power loss whereas only the auxiliary switch signal is absent in the tripped state.

In the single solenoid version of device 10, the processor 80 turns Q1 GATE ON to energize solenoid K1A to trip the device in the event of a miswired state. If miswiring is detected in the two-solenoid version of device 10, the Q4 Gate signal is provided to turn SCR Q4 ON and energize the redundant solenoid K1-B to trip the device.

Figure 10:
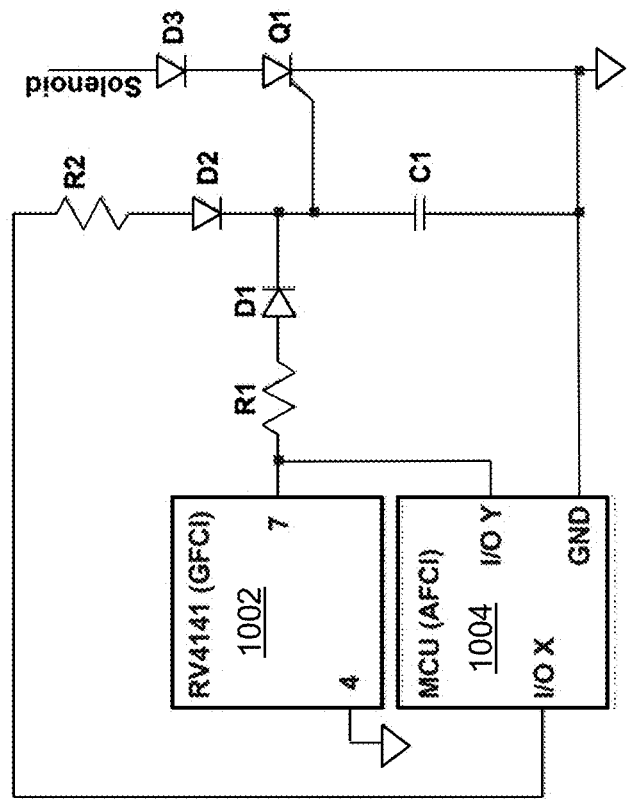
FIG. 10 is a schematic diagram of a protective device in accordance with another embodiment of the invention.

As embodied herein and depicted in FIG. 10, a schematic diagram of a protective device 1000 in accordance with another embodiment of the invention is disclosed. Specifically, protective device 10 is a combination AFCI/GFCI device 1000. The MCU 1004 also includes arc fault detection circuitry coupled to at least one sensor that is configured to sense the arcing condition (not shown). The MCU 1004 is coupled to the SCR Q1 by I/O X or I/O Y. Thus, the SCR Q1 receives a trip signal from diode D1 by way of the ground fault detector 1002 or the I/O Y output. The MCU output I/O X is coupled to the SCR Q1 via diode D2. Thus, diodes D1 and D2 form an OR Gate that allows the MCU 1004 to trip the device when one of the fault detectors (1002 or 1004) is defective. Those skilled in the art will appreciate other forms of OR gates that will also achieve this result, such an OR gate that instead of two diodes, comprises two resistors, or two SCR's, one SCR dedicated to ground fault interruption and the other to arc fault interruption (their anodes are both coupled to the trip solenoid), and so forth.

As before, the MCU 1004 performs end of life detection on GFCI 1002 by using multi-stage testing. MCU 1004 executes the automated test as described herein for previous embodiments of the invention. Capacitor C1 constitutes a low pass filter similar in performance to capacitor C7 in other embodiments of the invention. MCU 1004 may also perform end-of-life tests on AFCI sensors coupled to MCU 1004 or on the MCU 1004 itself.

Even though this and other ideas are presented in the context of a GFCI, those skilled in the art will appreciate that they apply to other types of protective devices such as AFCIs.

Referring to FIGS. 11A-11H, diagrammatic depictions illustrating the automatic multi-use miswiring (multi-shot) detection features of the present invention are disclosed. FIGS. 11A-H, provide simplified diagrams that are meant to help the reader's understanding of this subject matter. The various miswire circuits for generating a miswire detection signal rely on a connection to the device's ground terminal. Besides multi-shot miswire protection some also provide protection against other forms of miswire such as transposition of the hot and neutral conductors to the device ("reverse wiring"), or protection against a ground discontinuity in the electrical distribution system wiring. In each depiction, circuit interrupter 20 is shown in the reset position.

In FIG. 11A, GFCI 10 is properly wired. The ground circuit 50 (See FIG. 1A) is disposed on the line side of L1 and is connected to ground through electronic switch Q5. Q5 is automatically and momentarily closed each time processor 40 transitions from a deenergized state to an energized state. Si is timed to close during the positive half cycle. While Q5 is closed, the ground circuit 50 injects a circulating current (I) through the line hot and ground wires to simulate a ground fault condition. In one embodiment of the invention ground circuit 50 includes a 15K Ohm resistor. This current does not circulate through L1 and so there is no L1 output signal and the circuit interrupter does not trip.

In FIG. 11B, GFCI 10 is miswired. In this case, the ground current (I) circulates through L1 and is detected by L1 as differential current. Detector 18 turns ON SCR Q1. Since Q5 is closed during the positive half cycle, SCR Q1 turns ON during the positive half cycle and circuit interrupter 20 is tripped by way of GFCI solenoid K1-1. Each time the reset button is actuated the circuit interrupter will reset, however the circulating current resumes, and the interrupter 20 trips again. This process keeps repeating itself. The interrupter will remain reset and provide power only if the miswiring issue is corrected by the installer.

Figure 11C:
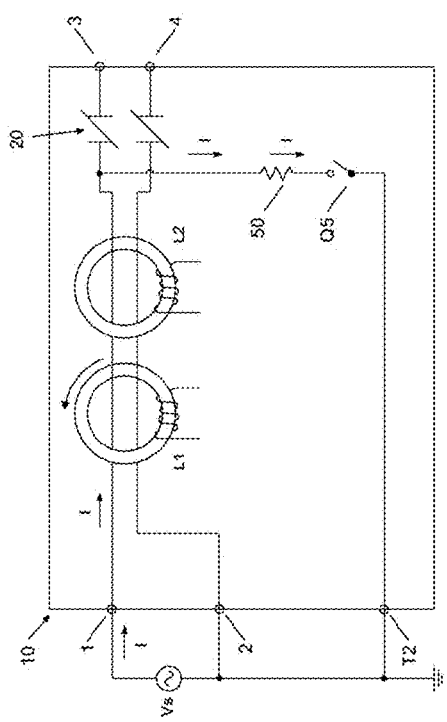
Figure 11D:
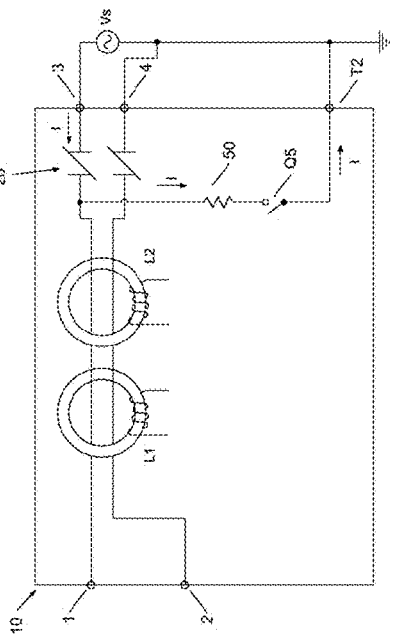

FIGS. 11C and 11D show another embodiment of the automatic multi-use miswire circuitry. In this embodiment, the ground circuit 50 is disposed on the load side of L1 and Q5 closes at a point in the AC line cycle where the circuit interrupter cannot trip (e.g., late in the positive half cycle or during the negative half cycle of the line frequency). When the closure occurs late in the positive half cycle there is not enough line voltage for the GFCI solenoid to release the trip mechanism. When the closure occurs in the negative half cycle, D6 is reverse biased and so even if SCR Q1 turns on, the GFCI solenoid K1-1 will not energize. FIG. 11C shows the GFCI being properly wired and L1 detecting the circulating current (I.) SCR Q1 turns ON but GFCI solenoid K1-1 does not trip circuit interrupter 20. Processor 40 recognizes the fact that SCR Q1 has turned ON and nothing happens. On the other hand, FIG. 11D shows the GFCI in a miswired state. This time the circulating current (I) does not get detected by L1 and so SCR Q1 does not turn ON. Processor 40 treats the failure to turn ON as it would an end of life condition and sends a signal to auto monitor pin 19 to turn ON SCR Q3 on to trip circuit interrupter 20 via self test solenoid K1-2 early in a positive half cycle.

Figure 11E:
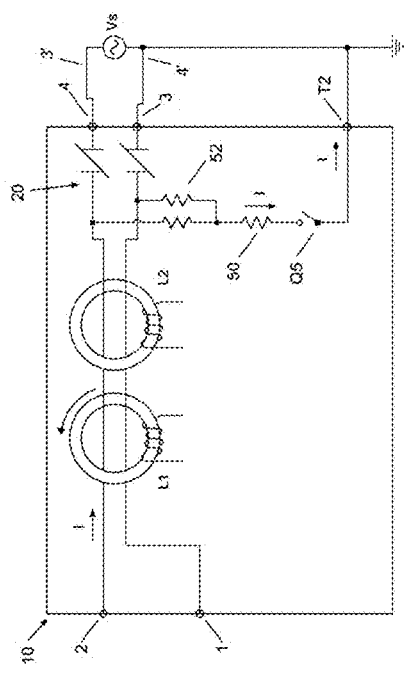

In FIG. 11E, another embodiment of the automatic miswire circuit is shown. This circuit configuration provides miswire protection even if there is a reverse polarity condition (transposition of the hot and neutral conductors from the AC voltage source.) As shown in FIG. 11E, the neutral conductor 4' is connected to the load hot terminal 3 and the hot conductor 3' wire is connected to the load neutral terminal 4. As such, FIG. 11E shows both a reverse polarity condition and a miswired condition. The multi-use miswire circuit is similar to the embodiment shown in FIGS. 11C-D except ground circuit 50 is coupled to line terminals (1, 2) via a voltage divider. That means the circulating current (I) will flow even when there is reverse polarity condition. In the manner of FIGS. 11C-D, the circulating current is not detected by L1 when there is a miswired condition which results in the circuit interrupter being tripped. However, the circulating current is detected when there is a proper wiring condition, and nothing happens.

The embodiment of FIG. 11C-D will not generate the circulating current under reverse polarity and so the circuit interrupter, even if properly wired, will not stay reset. This can be a safety feature in certain instances where reverse polarity presents a shock hazard, e.g., hazards that arise in certain appliances having polarized plugs.

There is also protection against an open ground condition. The open ground condition can be caused by a poor electrical connection to terminal T2 or the installation not having a ground conductor at all. In the embodiments shown in FIGS. 11C-E, the absence of circulating current (which happens if there is an open ground condition) causes the circuit interrupter to trip and not provide power to the load terminals.

Figure 11F:
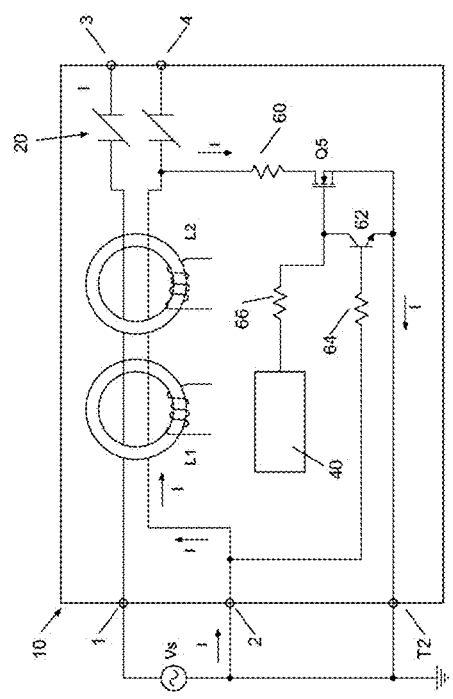

The embodiment of FIG. 11F relies on a simulated grounded neutral condition involving the ground conductor and neutral conductor. The simulated grounded neutral resistor 60 is less than about 4 Ohms, orders of magnitude less than the resistance employed in ground fault simulation circuits, e.g. ground circuit 50 includes a 15,000 Ohm resistance. As such, the simulated grounded neutral approach is capable of detecting an open ground condition at a lower value of impedance. In other words, the simulated ground neutral approach can detect open ground conditions that the simulated ground fault approach might fail to detect.

If the phase and neutral source conductors happen to be reverse polarized, resistor 60 would be disposed across the voltage source when FET Q5 turns ON and burn out. To prevent that from happening, transistor 62 is connected between line neutral terminal 2 and ground terminal T2 in series with resistor 64. Thus transistor 62 will be OFF when there is a correct polarity condition and ON when the hot conductor is connected to terminal 2 in the reverse polarity condition. Transistor 62 is what prevents FET Q5 from turning ON during the reverse polarity condition. When transistor 62 is OFF, FET Q5 is responsive to signals from processor 40 to turn ON.

The embodiment of FIG. 11F will not operate when there is a reverse polarity condition. This is because there will be no circulating current (I) even if the GFCI is properly wired. If it is desirable to have the grounded neutral simulation scheme still work under reverse polarity, transistor 62 when ON activates a reversing switch (not shown) that decouples resistors (60, 64) from line neutral terminal 2 and then couples them to line hot terminal 1 where the neutral conductor is at (resistors (60, 64) are still connected either side of transformers L1, L2). Consequently the circulating current (I) flows even though there is a reverse polarity condition, when the device is properly wired.

Figure 11G:
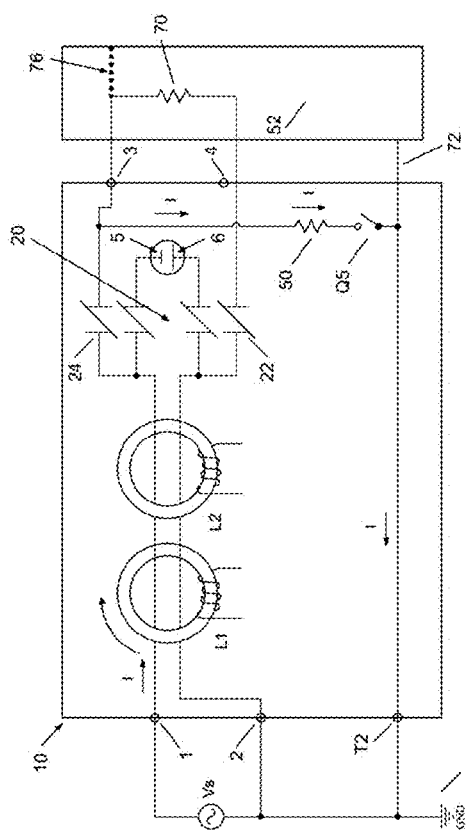

Another embodiment is shown in FIG. 11G, and illustrates that the simulation circuit 50 can be connected to the load side of the circuit interrupting contacts. The circuit operates similarly to the embodiment shown in FIGS. 11C-D.

The embodiment of FIG. 11G illustrates the benefit of joining a ground continuity monitor to an interrupting device such as a GFCI. Although FIG. 11G is used, the benefit could have been demonstrated with other embodiments of the invention. A load 70 is connected to a set of load terminals (3, 4.) Load 70 has a metallic housing 72 connected to ground terminal T2. If there is a discontinuity in the ground path between the ground at the panel 74 and terminal T2, and there is no circuit-interrupting provision, nothing happens. Then should a fault condition 76 occur between load 70 and the metallic housing 72, the user is exposed to risk of electric shock when touching the housing 72 with nothing to stop it. However, with the circuit interrupter, load power is interrupted when there is a ground discontinuity between terminal T2 and ground 74. When load 70 is decoupled from the power source there is no possibility of an electric shock due to the compromised insulation in load 70. As such, GFCI 10 protects the user from electric shock two ways: through assuring that the ground is present and through the ability to detect and interrupt a ground fault condition. Another benefit shown in FIG. 11G, is that the circulating current (I) passes through the set of interrupting contacts 24. Processor 40 recognizes that there is circulating current (I) via SCR Q1 turning ON and interprets this to mean via SCR OUT (pin 15) that circuit interrupter 20 is reset. However, processor 40 also monitors the state of the circuit interrupter by monitoring auxiliary switch 16 by way of INT STATUS (pin 20.) When there is disagreement between the two processor inputs (15, 20), i.e., one indicating reset while the other indicating tripped, processor 40 activates a trip command via one or both solenoids (K1-A,K1-B) or indicates an end of life condition in interrupter 20 via indicator D7. An example of a circuit interrupter end of life condition is welded power contacts.

Figure 11H:
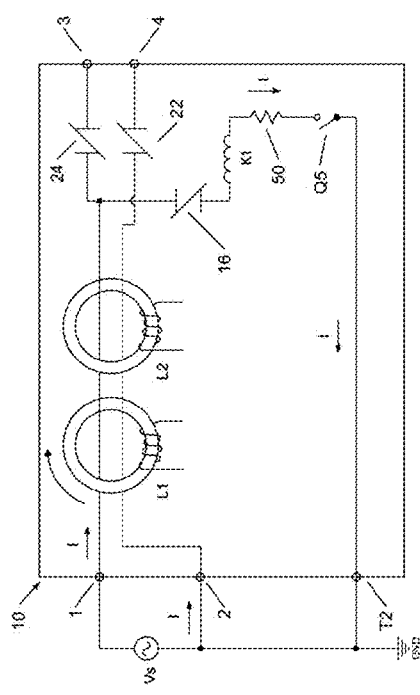

In FIG. 11H, power is derived from the auxiliary switch circuit 16 and solenoid K1-A or K1-B. Referring back to FIG. 11B, the inductance of solenoid K1-A and MOV1, or the inductance of solenoid K1-B and MOV 3 protect ground component 50 and transistor Q5 circuit from lightning surges.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. There is no intention to limit the invention to the specific form or forms disclosed, but on the contrary, the intention is to cover all modifications, alternative constructions, and equivalents falling within the spirit and scope of the invention, as defined in the appended claims. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A protective electrical wiring device comprising:
   a plurality of line terminals and a plurality of load terminals configured to be coupled to an AC electrical distribution system;
   a protective assembly including a sensor portion, a fault detection portion and a switch portion, the sensor portion being configured to provide at least one sensor signal corresponding to electrical signals propagating on the plurality of line terminals or the plurality of load terminals, the fault detection portion being configured to provide a detector output signal when the at least one sensor signal exceeds a predetermined threshold, the switch portion including a conditioning circuit coupled to a switch element, the conditioning circuit generating a control voltage signal in response to the detector output signal, the switch element being configured to turn ON when the control voltage signal is greater than or equal to a switch actuation threshold; and
   a control circuit configured to automatically perform a test cycle from time to time, each test cycle comprising a series of tests that determine the operational state of the protective assembly, at least one successive test in the test cycle being configured to test at least a portion of the protective assembly tested by a predecessor test in the test cycle, the control circuit being configured to establish a test result for each test in the series of tests, each test result being stored in a test result table, the control circuit being configured to effect or not effect an end-of-life state by evaluating at least a portion of the test results in the test result table in accordance with a predetermined voting scheme.

2. The device of claim 1, wherein the test result table includes test results from a plurality of test cycles, the predetermined voting scheme allowing at least one predetermined pattern of test failures to occur for each test in the series of tests within a predetermined number of test cycles before the control circuit effects the end-of-life state.

3. The device of claim 1, wherein the predetermined voting scheme provides a predetermined number of allowable aggregate test table failures to occur within a predetermined number of test cycles, the control circuit being configured to effect the end-of-life state when an aggregate number of test failures in the test table is greater than or equal to the predetermined number of allowable aggregate test table failures.

4. The device of claim 3, wherein the control circuit is configured to effect the end-of-life state based on the aggregate number of test failures even when a number of tests failures attributable to each individual test in the series of tests is less than a failure number required by the predetermined voting scheme.

5. The device of claim 1, wherein a predetermined number of allowable test failures for one test in the series of tests is different than a predetermined number of allowable column test failures for another test in the series of tests.

6. The device of claim 5, wherein the predetermined number of allowable test failures for the one test are for a first predetermined number of cycles and the predetermined number of allowable column test failures for the other test are for a second predetermined number of cycles.

7. The device of claim 1, wherein the control circuit is configured to generate a recurring test signal in a first test of the series of tests, the sensor portion and the fault detection portion being operational if the conditioning circuit provides the control voltage signal in response to the recurring test signal, the control circuit terminating the recurring test signal when the control voltage signal reaches a test acceptance voltage, the control circuit storing a first test result in the test result table indicative of whether the control voltage signal reaches the test acceptance voltage within a predetermined time frame.

8. The device of claim 1, wherein the fault detection portion includes a delay filter that delays the detector output signal with respect to the at least one sensor signal.

9. The device of claim 8, wherein the fault detection portion includes a comparator that compares an amplified sensor signal to a reference signal, the delay filter being coupled to the output of the comparator.

10. The device of claim 1, further comprising a housing including a front cover portion and a back body portion, the front cover portion including a user accessible portion having a manual test control input, a manual reset control input and at least one indicator portion, the at least one indicator portion providing at least one of a reset state, a trip state, or an operational status.

11. The device of claim 1, wherein the plurality of load terminals includes receptacle load terminals and feed-through load terminals that are decoupled in a tripped state.

12. The device of claim 1, further comprising a circuit interrupter disposed between the plurality of line terminals and the plurality of load terminals, the circuit interrupter coupling the plurality of line terminals and the plurality of load terminals in a reset state and decoupling the plurality of line terminals and the plurality of load terminals in a tripped state, the tripped state being effected when the control voltage signal reaches the switch actuation threshold or when the control circuit effects the end-of-life state.

13. The device of claim 12, wherein the protective electrical wiring device is configured to drive the circuit interrupter into the tripped state only during a predetermined half cycle polarity of the AC voltage source, and wherein the control circuit is configured to test the sensor portion or fault detection portion for an end-of-life condition in the predetermined half cycle polarity of the AC voltage source.

14. The device of claim 1, wherein the control circuit is configured to provide a second recurring test signal in place of the detector output signal in a second test of the series of tests, the second recurring test signal driving the conditioning circuit to provide a control voltage signal that is greater than or equal to the switch actuation threshold if the conditioning circuit is in an operational state, the switch element being configured to turn ON in response to the control voltage signal if the switch element is in an operational state, the control circuit storing a second test result in the test table indicative of whether the switch element turned ON within a second predetermined time frame.

15. The device of claim 14, further comprising a circuit interrupter assembly disposed between the plurality of line terminals and the plurality of load terminals, the circuit interrupter assembly including a solenoid coil coupled to an AC power source in the AC electrical distribution system, the solenoid coil being energized to trip the circuit interrupter assembly when the switch element is turned ON during a fault detection mode, the solenoid coil not being energized to trip the circuit interrupter assembly when the switch element is turned ON during the second test.

16. The device of claim 15, further comprising a second switch element disposed in series between the switch element and the solenoid coil, the second switch element preventing the switch element from energizing the solenoid coil during the second test.

17. The device of claim 16, wherein the second switch element includes a diode.

18. The device of claim 16, wherein the control circuit is configured to monitor a switch voltage of the switch element during a third test in the series of tests, the control circuit storing a third test result in the test result table indicative of whether the switch voltage was characterized by a predetermined polarity.

19. The device of claim 1, wherein the control circuit uses a signal pin as an input port to measure a value of the control voltage signal during a first test of the series of tests, and wherein the control circuit uses the signal pin as an output port to provide a second recurring test signal in place of the detector output signal in a second test of the series of tests.

20. The device of claim 1, further comprising a power supply circuit disposed between a hot line terminal of the plurality of line terminals and the switch element, the power supply circuit including a diode element disposed in series with the switch element, the diode being reversed biased during a negative half cycle of an AC power source, the control circuit being configured to monitor a switch voltage of the switch element during a third test in the series of tests, the control circuit storing a third test result in the test table indicative of whether the switch voltage was characterized by a positive polarity during the negative half cycle.

21. The device of claim 1, wherein the series of tests includes at least three different types of recurring tests.

22. The device of claim 1, wherein the switch element comprises a first switch and a second switch coupled to a circuit interrupter, the control voltage signal from the conditioning circuit being configured to turn the first switch ON to trip the circuit interrupter when there is a detected fault condition, the control circuit being configured to turn the second switch ON to trip the circuit interrupter when the end-of-life state is effected.

23. The device of claim 22, wherein the first switch and the second switch are coupled to separate solenoids either of which trip the circuit interrupter when energized.

24. The device of claim 1, wherein the conditioning circuit includes a low pass filter.

25. The device of claim 1, wherein successive tests in the test cycle overlap one another.

* * * * *